United States Patent
Yang et al.

(10) Patent No.: US 11,196,597 B2
(45) Date of Patent: Dec. 7, 2021

(54) ORTHOGONAL DEMODULATION REFERENCE SIGNAL (DMRS) PORT GENERATION FOR PI/2 BINARY PHASE SHIFT KEYING (BPSK)

(71) Applicant: QUALCOMM Incorporated, San Diego, CA (US)

(72) Inventors: Wei Yang, San Diego, CA (US); Yi Huang, San Diego, CA (US); Peter Gaal, San Diego, CA (US); Gokul Sridharan, San Diego, CA (US); Seyong Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/591,186

(22) Filed: Oct. 2, 2019

(65) Prior Publication Data
US 2020/0112466 A1     Apr. 9, 2020

Related U.S. Application Data

(60) Provisional application No. 62/742,127, filed on Oct. 5, 2018.

(51) Int. Cl.
*H04L 27/20*      (2006.01)
*H04L 27/26*      (2006.01)
(Continued)

(52) U.S. Cl.
CPC ....... *H04L 27/2032* (2013.01); *H04B 7/0452* (2013.01); *H04L 5/0051* (2013.01); *H04L 5/10* (2013.01); *H04L 27/2613* (2013.01)

(58) Field of Classification Search
None
See application file for complete search history.

(56) References Cited

U.S. PATENT DOCUMENTS

2011/0019776 A1*  1/2011  Zhang ............... H04L 5/0048
                                                     375/340
2019/0229871 A1*  7/2019  Shi ..................... H04L 5/0051

FOREIGN PATENT DOCUMENTS

EP           3413495 A1    12/2018
WO        2017135693 A1     8/2017

OTHER PUBLICATIONS

Ericsson: "Remaining Details on DMRS Design," 3GPP Draft, 3GPP TSG RAN WG1 Meeting 91, R1-1720736, Remaining Details on DMRS Design, 3RD Generation Partnership Project (3GPP), Mobile Competence Centre, 650, Route Des Lucioles, F-06921, Sophia-Antipolis Cedex, France, vol. RAN WG1, No. Reno, USA, Nov. 27, 2017-Dec. 1, 2017, Nov. 18, 2017 (Nov. 18, 2017), XP051370193, Retrieved from the Internet: URL: http://www.3gpp.org/ftp/tsg%5Fran/WG1%5FRL1/TSGR1%5F91/Docs/ [retrieved on Nov. 18, 2017], Sec.5.2.2, 15 pages.

(Continued)

*Primary Examiner* — James P Duffy
(74) *Attorney, Agent, or Firm* — Harrity & Harrity, LLP

(57) ABSTRACT

Various aspects of the present disclosure generally relate to wireless communication. In some aspects, a user equipment (UE) may generate multiple orthogonal demodulation reference signal (DMRS) sequences associated with multiple orthogonal DMRS ports based at least in part on a pi/2 binary phase shift keying (BPSK) based DMRS base sequence and based at least in part on utilizing at least one of a frequency-domain comb structure or a time-domain orthogonal cover code (OCC), wherein the multiple orthogonal DMRS ports are associated with different UEs; determine a DMRS port, of the multiple orthogonal DMRS ports, to be used in association with a transmission of pi/2 BPSK modulated data; and transmit the pi/2 BPSK modulated data and a DMRS sequence, of the multiple orthogonal (Continued)

DMRS sequences, associated with the DMRS port. Numerous other aspects are provided.

32 Claims, 17 Drawing Sheets

(51) Int. Cl.
  *H04B 7/0452* (2017.01)
  *H04L 5/00* (2006.01)
  *H04L 5/10* (2006.01)

(56) References Cited

OTHER PUBLICATIONS

International Search Report and Written Opinion—PCT/US2019/054467—ISA/EPO—dated Jan. 17, 2020.

* cited by examiner

934 → pi/2 BPSK based DMRS base sequence $X = [X_1, X_2, \ldots X_{N/2}]$

| DMRS Port | DMRS Port Group | Sequence |
|---|---|---|
| 0 | 0 | $S_0 = [X_1, X_2, \ldots, X_{N/2}, X_1, X_2, \ldots, X_{N/2}]$ |
| 1 | 0 | $S_1 = [X_1, -X_2, \ldots, X_{N/2-1}, -X_{N/2}, X_1, -X_2, \ldots, X_{N/2-1}, -X_{N/2}]$ |
| 2 | 1 | $S_2 = [X_1, X_2, \ldots, X_{N/2}, -X_1, -X_2, \ldots, -X_{N/2-1}, -X_{N/2}]$ |
| 3 | 1 | $S_3 = [X_1, -X_2, \ldots, X_{N/2-1}, -X_{N/2}, -X_1, -X_2, \ldots, X_{N/2-1}, X_{N/2}]$ |

FIG. 9F

ORTHOGONAL DEMODULATION REFERENCE SIGNAL (DMRS) PORT GENERATION FOR PI/2 BINARY PHASE SHIFT KEYING (BPSK)

RELATED APPLICATION

This application claims priority to U.S. Provisional Patent Application No. 62/742,127, filed on Oct. 5, 2018, entitled "ORTHOGONAL DEMODULATION REFERENCE SIGNAL (DMRS) PORT GENERATION FOR PI/2 BINARY PHASE SHIFT KEYING (BPSK)," which is hereby expressly incorporated by reference herein.

FIELD OF THE DISCLOSURE

Aspects of the present disclosure generally relate to wireless communication and to techniques and apparatuses for orthogonal demodulation reference signal (DMRS) port generation for pi/2 binary phase shift keying (BPSK).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In some aspects, a method of wireless communication, performed by a user equipment (UE), may include generating multiple orthogonal demodulation reference signal (DMRS) sequences associated with multiple orthogonal DMRS ports based at least in part on a pi/2 binary phase shift keying (BPSK) based DMRS base sequence and based at least in part on utilizing at least one of a frequency-domain comb structure or a time-domain orthogonal cover code (OCC), wherein the multiple orthogonal DMRS ports are associated with different UEs; determining a DMRS port, of the multiple orthogonal DMRS ports, to be used in association with a transmission of pi/2 BPSK modulated data; and transmitting the pi/2 BPSK modulated data and a DMRS sequence, of the multiple orthogonal DMRS sequences, associated with the DMRS port.

In some aspects, a UE for wireless communication may include memory and one or more processors operatively coupled to the memory. The memory and the one or more processors may be configured to generate multiple orthogonal demodulation reference signal (DMRS) sequences associated with multiple orthogonal DMRS ports based at least in part on a pi/2 binary phase shift keying (BPSK) based DMRS base sequence and based at least in part on utilizing at least one of a frequency-domain comb structure or a time-domain orthogonal cover code (OCC), wherein the multiple orthogonal DMRS ports are associated with different UEs; determine a DMRS port, of the multiple orthogonal DMRS ports, to be used in association with a transmission of pi/2 BPSK modulated data; and transmit the pi/2 BPSK modulated data and a DMRS sequence, of the multiple orthogonal DMRS sequences, associated with the DMRS port.

In some aspects, a non-transitory computer-readable medium may store one or more instructions for wireless communication. The one or more instructions, when executed by one or more processors of a UE, may cause the one or more processors to: generate multiple orthogonal demodulation reference signal (DMRS) sequences associated with multiple orthogonal DMRS ports based at least in part on a pi/2 binary phase shift keying (BPSK) based DMRS base sequence and based at least in part on utilizing at least one of a frequency-domain comb structure or a time-domain orthogonal cover code (OCC), wherein the multiple orthogonal DMRS ports are associated with different UEs; determine a DMRS port, of the multiple orthogonal DMRS ports, to be used in association with a transmission of pi/2 BPSK modulated data; and transmit the pi/2 BPSK modulated data and a DMRS sequence, of the multiple orthogonal DMRS sequences, associated with the DMRS port.

In some aspects, an apparatus for wireless communication may include means for generating multiple orthogonal demodulation reference signal (DMRS) sequences associated with multiple orthogonal DMRS ports based at least in part on a pi/2 binary phase shift keying (BPSK) based DMRS base sequence and based at least in part on utilizing at least one of a frequency-domain comb structure or a time-domain orthogonal cover code (OCC), wherein the multiple orthogonal DMRS ports are associated with different UEs; means for determining a DMRS port, of the multiple orthogonal DMRS ports, to be used in association with a transmission of pi/2 BPSK modulated data; and means for transmitting the pi/2 BPSK modulated data and a DMRS sequence, of the multiple orthogonal DMRS sequences, associated with the DMRS port.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 9A-9G are diagrams illustrating an example of orthogonal demodulation reference signal (DMRS) port generation for pi/2 binary phase shift keying (BPSK), in accordance with various aspects of the present disclosure.

DETAILED DESCRIPTION

Figure 1:
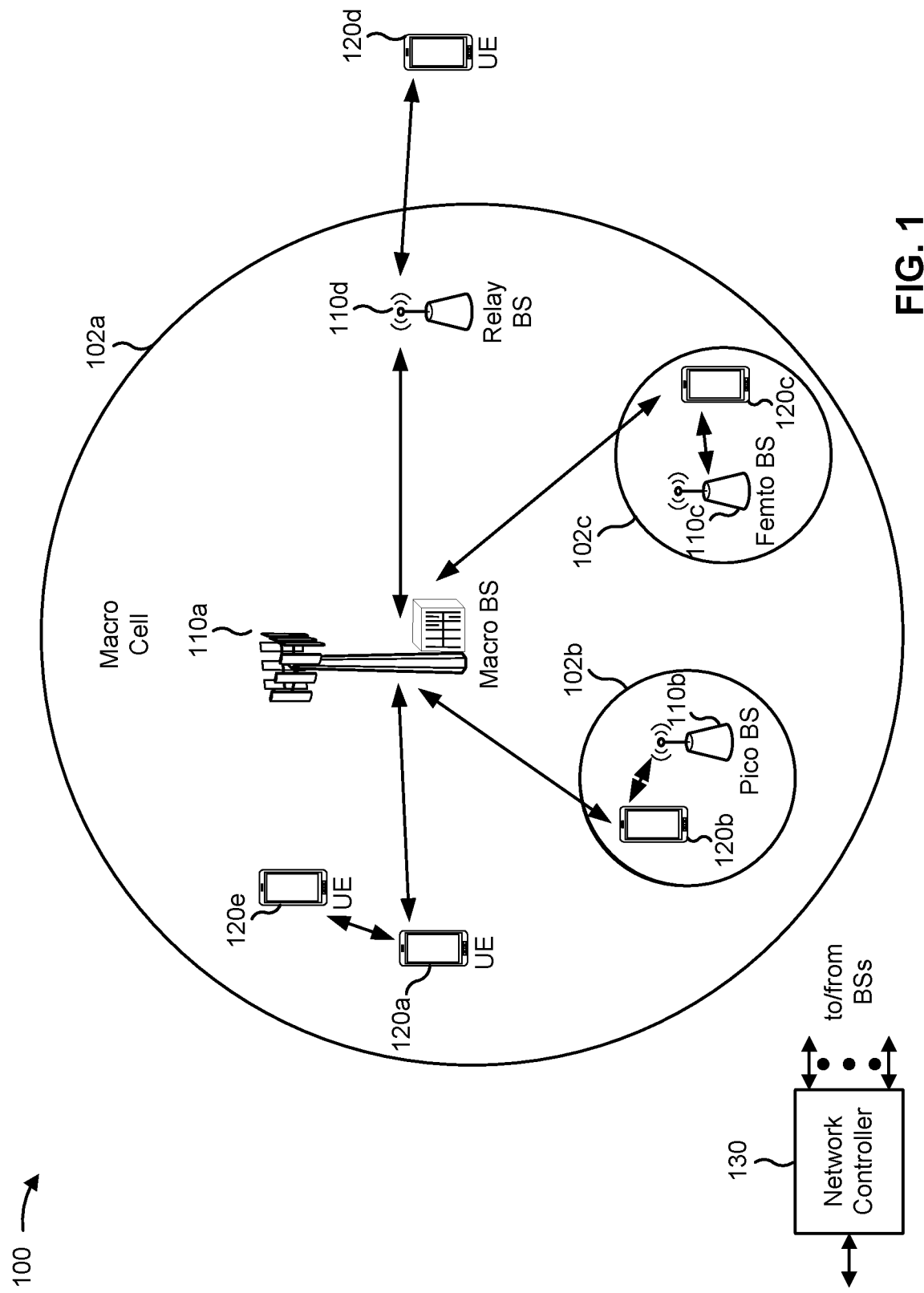
FIG. 1 is a block diagram conceptually illustrating an example of a wireless communication network, in accordance with various aspects of the present disclosure.

Currently, pi/2 binary phase shift keying (BPSK) modulation with discrete Fourier transform (DFT)-spread-orthogonal frequency-division multiplexing (OFDM) (DFT-s-OFDM) is supported for uplink transmissions in new radio (NR) Release 15. This modulation scheme provides a lower peak-to-average-power-ratio (PAPR) for a user equipment (UE) relative to other modulation schemes, such as quadrature phase shift keying (QPSK), quadrature amplitude modulation (QAM), and/or the like, which may result in improved performance for the UE when power limited (e.g., at a cell edge). However, the pi/2 BPSK modulation is used with a corresponding demodulation reference signal (DMRS) sequence that is a Zadoff-Chu (ZC)-based sequence. As a result, the DMRS sequence may have a higher PAPR relative to the pi/2 BPSK based uplink transmissions. This causes link budget loss with regard to a communications link between the UE and a base station (BS) and/or causes transmission power to be limited by the DMRS rather than a data signal, thereby causing performance issues with regard to the UE. Furthermore, in NR Release 16, new DMRS sequences based on pi/2 BPSK modulation will be introduced. The new DMRS sequences have the same PAPR as pi/2 BPSK modulated data transmissions, and therefore do not experience the problem described above.

Current techniques for orthogonal DMRS port generation in NR use a frequency comb structure (e.g., where the modulation sequence is only transmitted on a subset of frequency tones, such as even frequency tones or odd frequency tones) in combination with a time-domain cyclic shift (CS) to generate four orthogonal DMRS ports on a single OFDM symbol. Further, current techniques use orthogonal cover code (OCC) across two OFDM symbols to generate eight orthogonal DMRS ports across the two OFDM symbols. While these techniques generate orthogonal DMRS ports for a ZC-based DMRS sequence (which is currently used in NR), the current techniques cannot be applied to a pi/2 BPSK based DMRS base sequence to generate orthogonal DMRS ports to support multi-user, multiple input multiple output (MU-MIMO). The current techniques cannot be applied to a pi/2 BPSK based DMRS base sequence because the pi/2 BPSK based DMRS sequence has different characteristics in the frequency domain compared to the ZC-based DMRS sequence (e.g., the ZC-based DMRS sequence has a flat amplitude in the frequency domain whereas the pi/2 BPSK based DMRS base sequence has a variable amplitude in the frequency domain). Based on this, using time-domain CS for the pi/2 BPSK based DMRS base sequence will not generate orthogonal DMRS ports.

Some techniques and apparatuses described herein provide generation of orthogonal DMRS ports based at least in part on a pi/2 BPSK based DMRS base sequence. For example, and as described elsewhere herein, a UE may generate the orthogonal DMRS ports based at least in part on a pi/2 BPSK based DMRS base sequence and based at least in part on utilizing a frequency-domain comb structure and a time-domain OCC. In this way, techniques and apparatuses described herein facilitate use of orthogonal DMRS ports with pi/2 BPSK modulation. This reduces or eliminates link budget loss, limits transmission power, and/or the like associated with current techniques, thereby improving communications and/or performance of the UE with regard to uplink channel usage.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
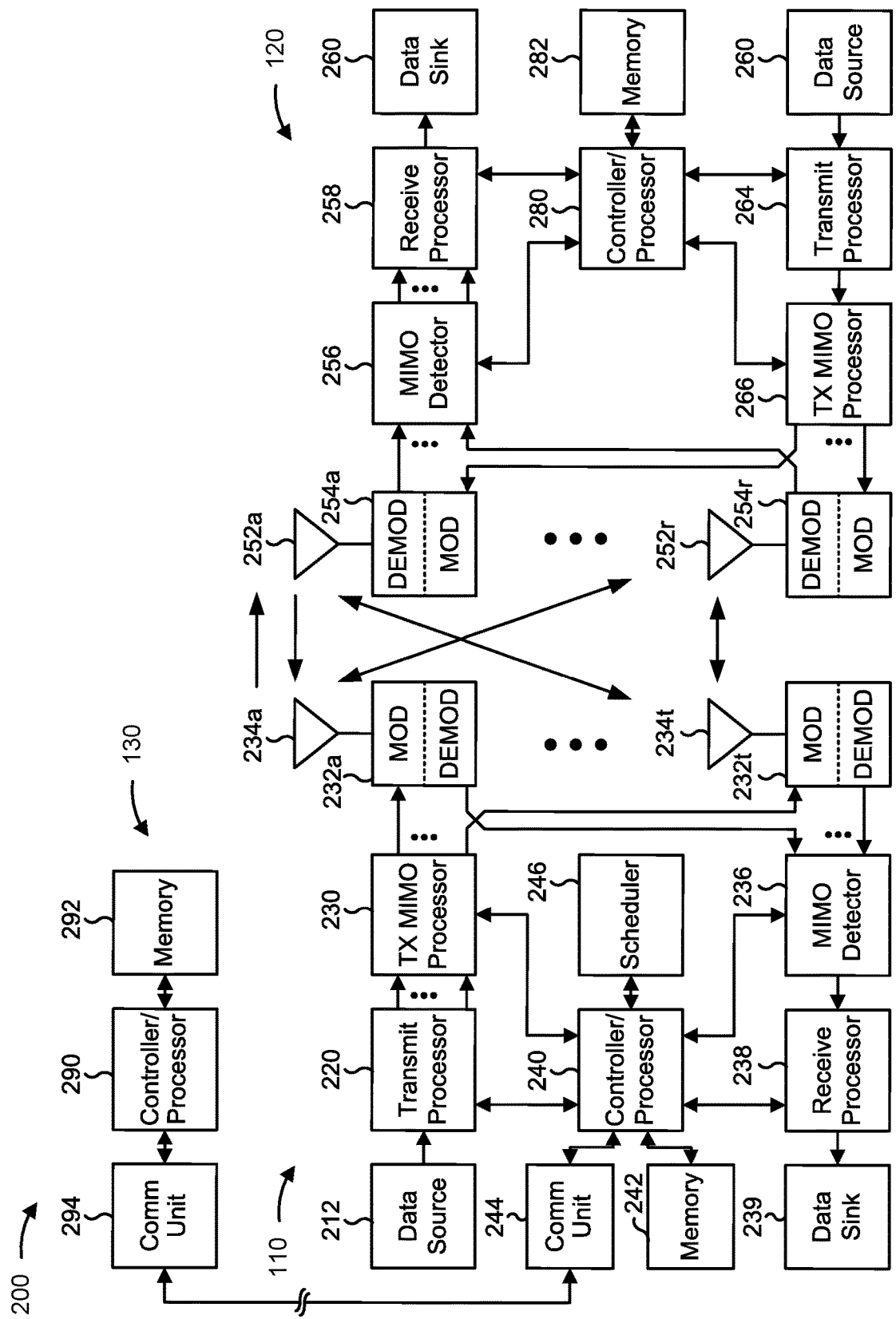
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with orthogonal DMRS port generation for pi/2 BPSK, as described in more detail elsewhere herein. For example, controller/processor 240 of base station 110, controller/processor 280 of UE 120, and/or any other component(s) of FIG. 2 may perform or direct operations of, for example, process 1000 of FIG. 10, and/or other processes as described herein. Memories 242 and 282 may store data and program codes for base station 110 and UE 120, respectively. A scheduler 246 may schedule UEs for data transmission on the downlink and/or uplink.

Figure 10:
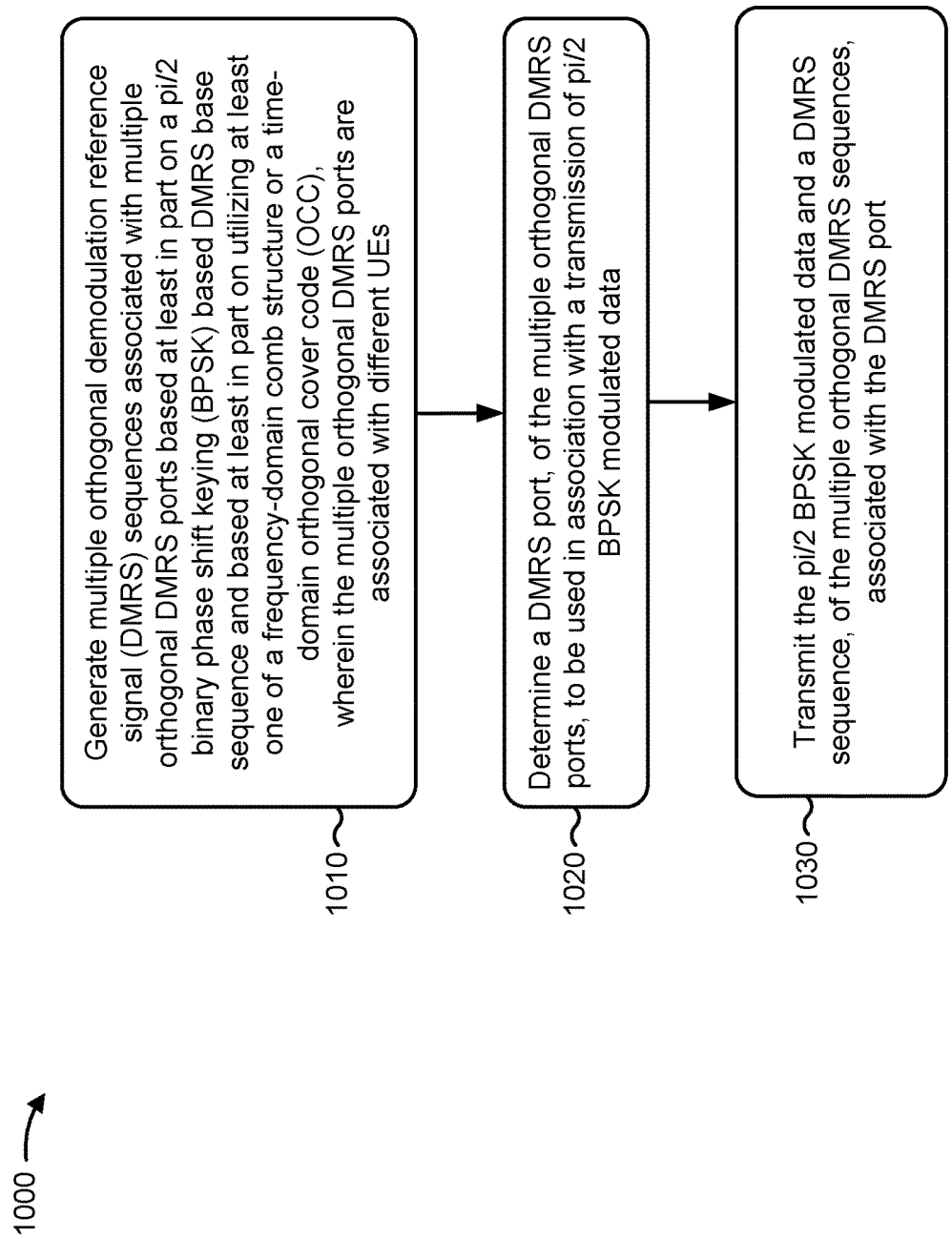
FIG. 10 is a diagram illustrating an example process performed, for example, by a user equipment, in accordance with various aspects of the present disclosure.

The stored program codes, when executed by processor 280 and/or other processors and modules at UE 120, may cause the UE 120 to perform operations described with respect to process 1000 of FIG. 10, and/or other processes as described herein. A scheduler 246 may schedule UEs for data transmission on the downlink and/or uplink.

In some aspects, UE 120 may include means for generating multiple orthogonal demodulation reference signal (DMRS) sequences associated with multiple orthogonal DMRS ports based at least in part on a pi/2 binary phase shift keying (BPSK) based DMRS base sequence and based at least in part on utilizing at least one of a frequency-domain comb structure or a time-domain orthogonal cover code (OCC), wherein the multiple orthogonal DMRS ports are associated with different UEs; means for determining a DMRS port, of the multiple orthogonal DMRS ports, to be used in association with a transmission of pi/2 BPSK modulated data; means for transmitting the pi/2 BPSK modulated data and a DMRS sequence, of the multiple orthogonal DMRS sequences, associated with the DMRS port; and/or the like. In some aspects, such means may include one or more components of UE 120 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of processor 280.

As indicated above, FIG. 2 is provided merely as an example. Other examples are possible and may differ from what was described with regard to FIG. 2.

Figure 3A:
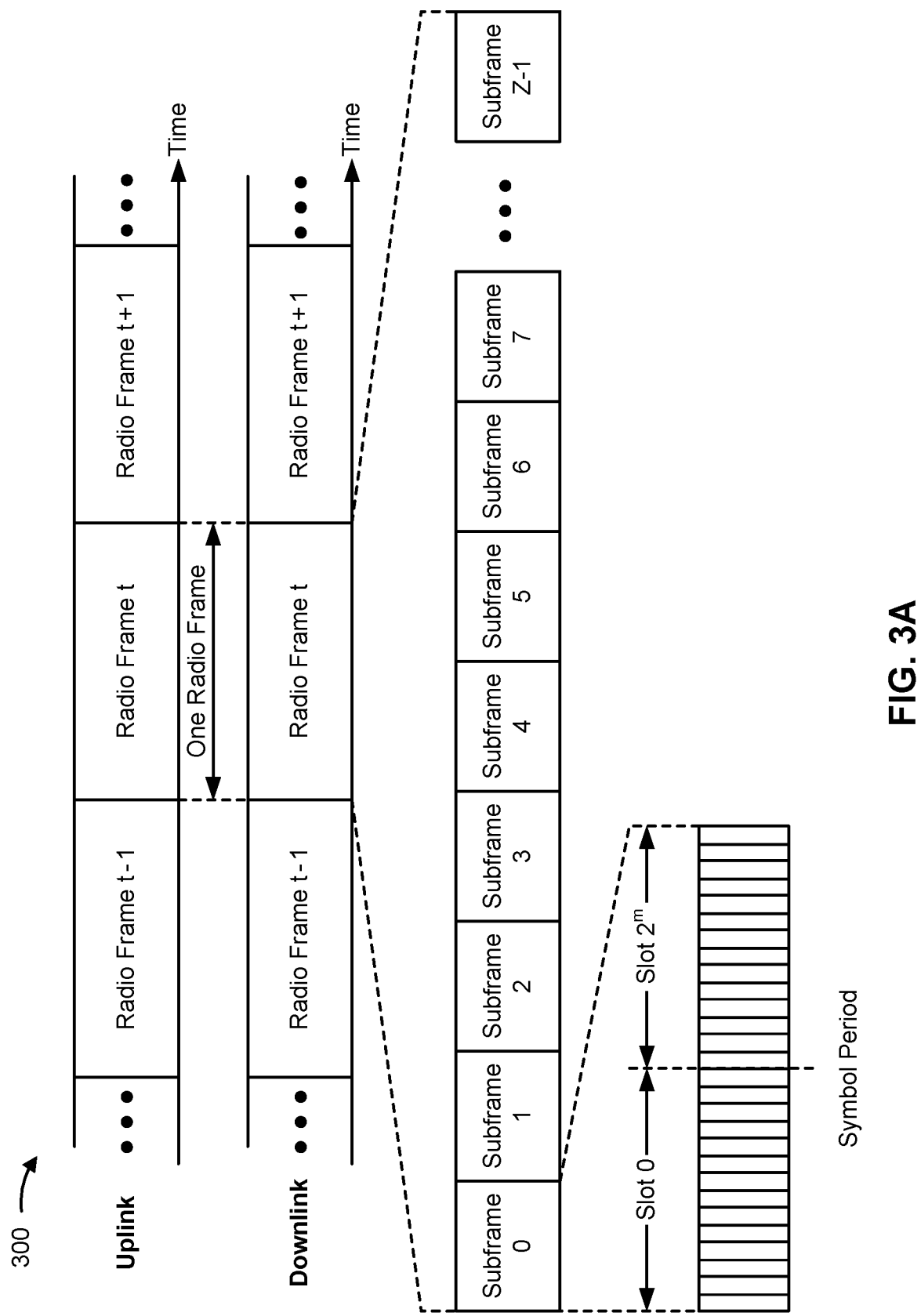
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
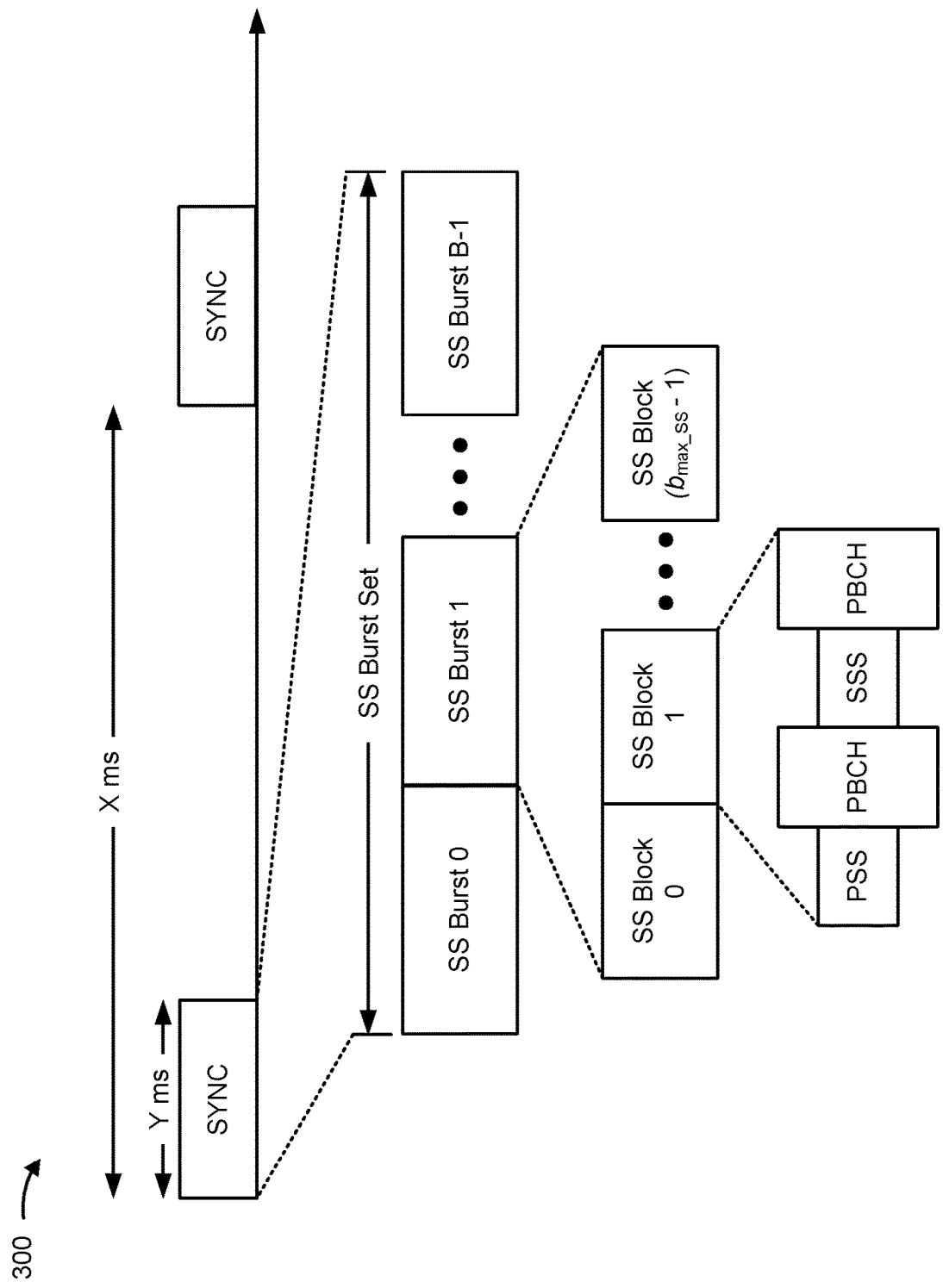
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples are possible and may differ from what was described with regard to FIGS. 3A and 3B.

Figure 4:
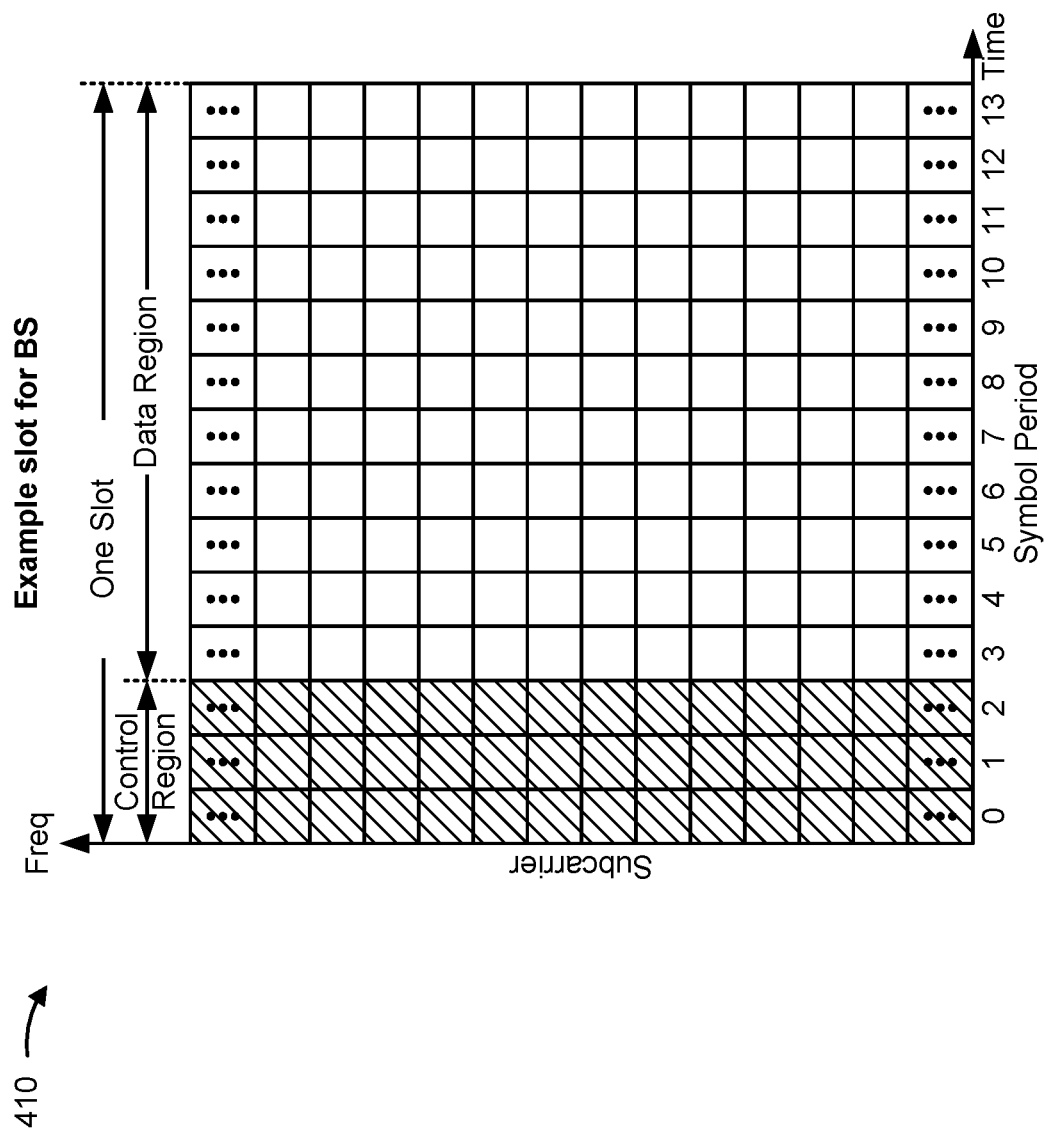
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

Figure 5:
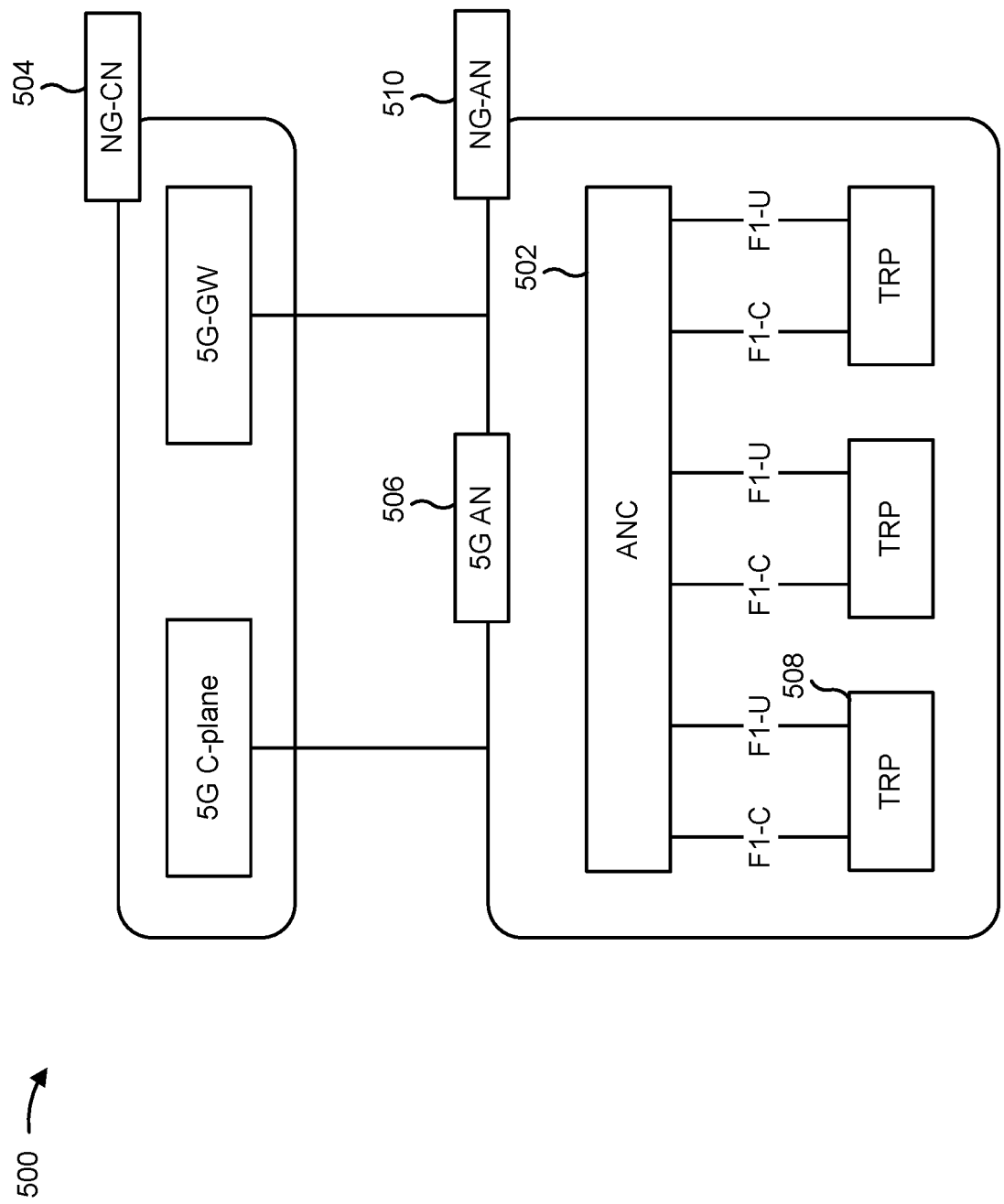
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
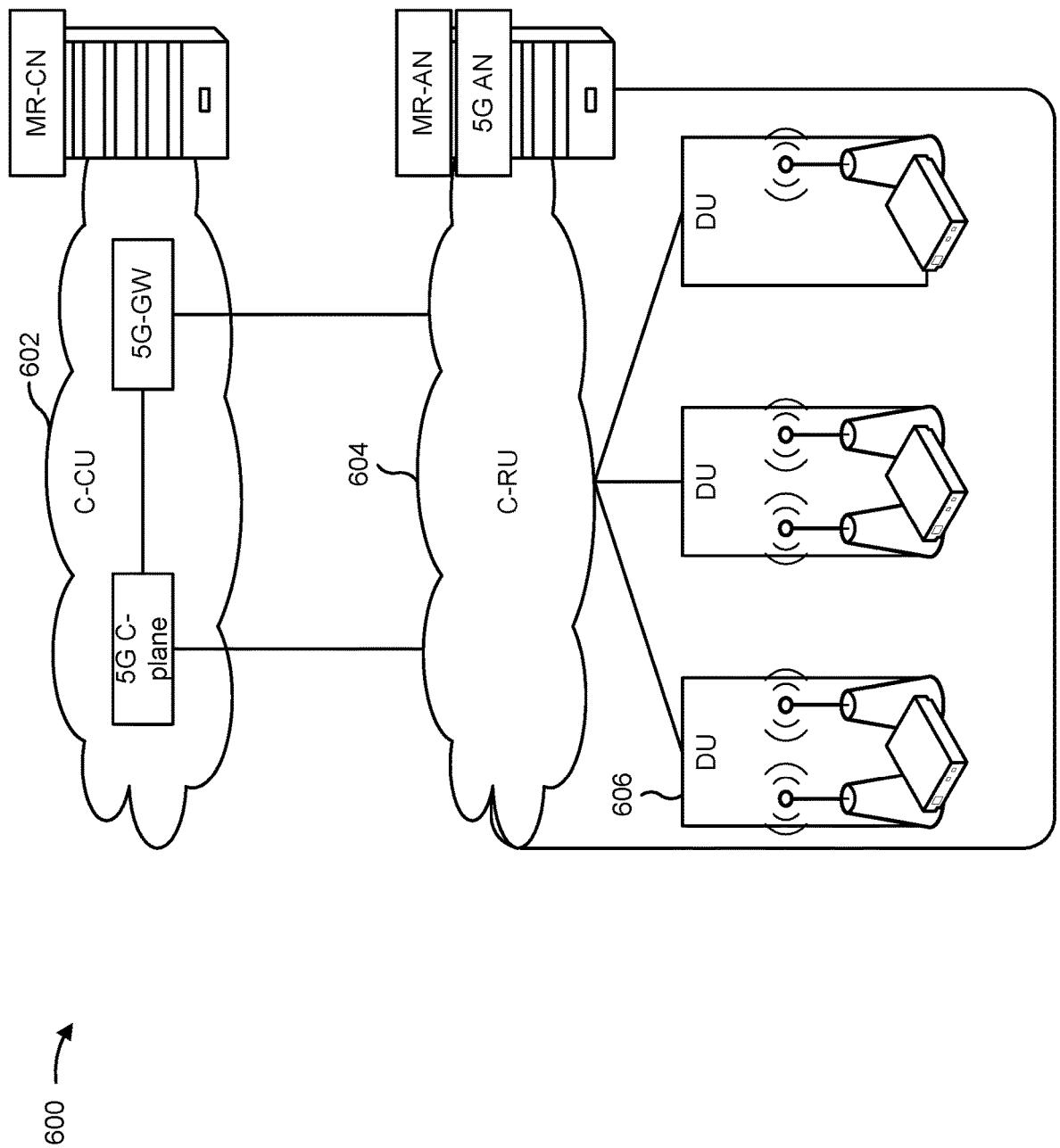
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

Figure 7:
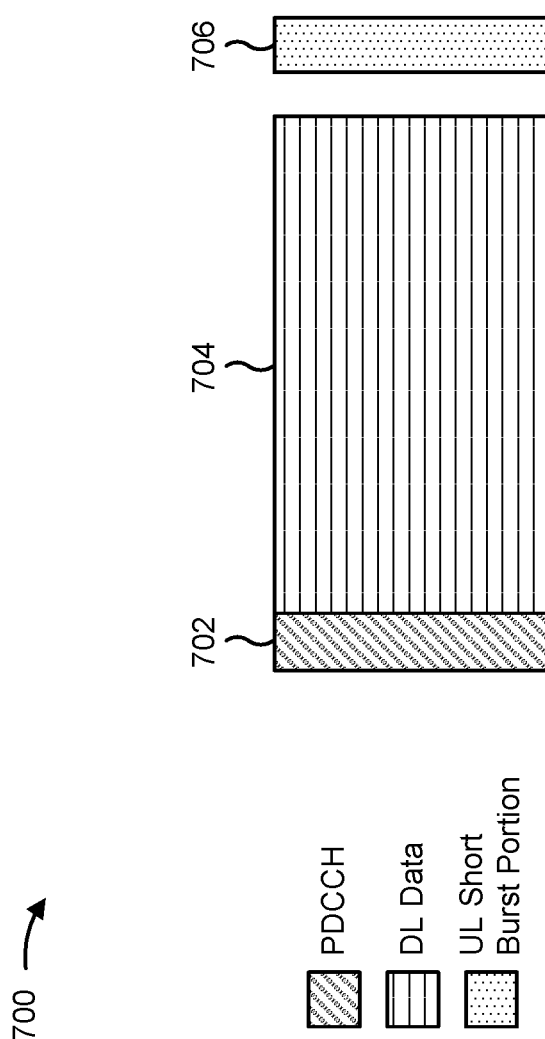
FIG. 7 is a diagram illustrating an example of a downlink (DL)-centric slot, in accordance with various aspects of the present disclosure.

FIG. 7 is a diagram 700 showing an example of a DL-centric slot or wireless communication structure. The DL-centric slot may include a control portion 702. The control portion 702 may exist in the initial or beginning portion of the DL-centric slot. The control portion 702 may include various scheduling information and/or control information corresponding to various portions of the DL-centric slot. In some configurations, the control portion 702 may be a physical DL control channel (PDCCH), as indicated in FIG. 7. In some aspects, the control portion 702 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, and/or the like), and/or the like.

The DL-centric slot may also include a DL data portion 704. The DL data portion 704 may sometimes be referred to as the payload of the DL-centric slot. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric slot may also include an UL short burst portion 706. The UL short burst portion 706 may sometimes be referred to as an UL burst, an UL burst portion, a common UL burst, a short burst, an UL short burst, a common UL short burst, a common UL short burst portion, and/or various other suitable terms. In some aspects, the UL short burst portion 706 may include one or more reference signals. Additionally, or alternatively, the UL short burst portion 706 may include feedback information corresponding to various other portions of the DL-centric slot. For example, the UL short burst portion 706 may include feedback information corresponding to the control portion 702 and/or the data portion 704. Non-limiting examples of information that may be included in the UL short burst portion 706 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 706 may include additional or alternative information, such as information pertaining to random access channel (RACH) procedures, scheduling requests, and various other suitable types of information.

As illustrated in FIG. 7, the end of the DL data portion 704 may be separated in time from the beginning of the UL short burst portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 7 is provided merely as an example. Other examples are possible and may differ from what was described with regard to FIG. 7.

Figure 8:
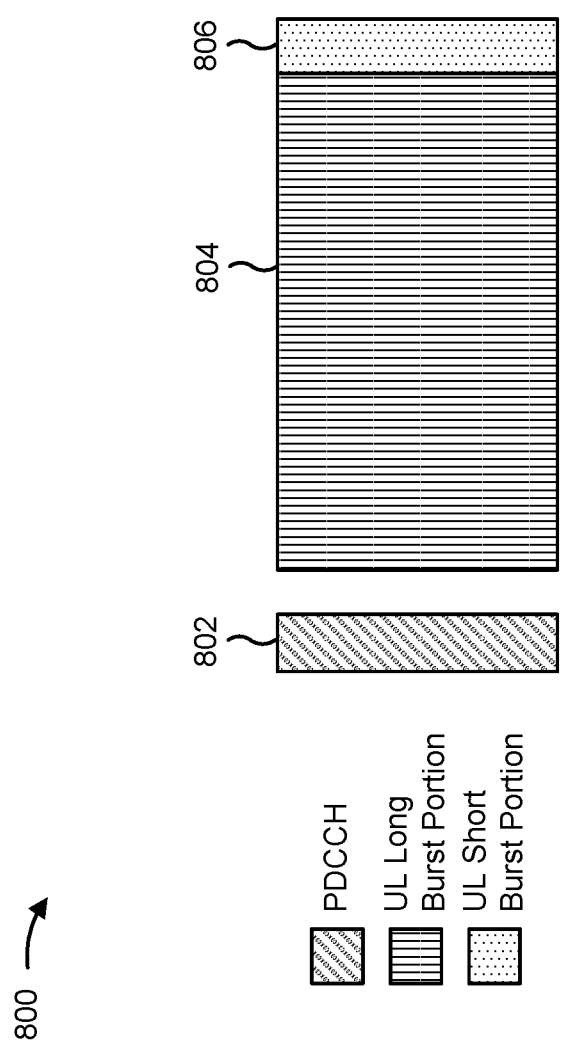
FIG. 8 is a diagram illustrating an example of an uplink (UL)-centric slot, in accordance with various aspects of the present disclosure.

FIG. 8 is a diagram 800 showing an example of an UL-centric slot or wireless communication structure. The UL-centric slot may include a control portion 802. The control portion 802 may exist in the initial or beginning portion of the UL-centric slot. The control portion 802 in FIG. 8 may be similar to the control portion 702 described above with reference to FIG. 7. The UL-centric slot may also include an UL long burst portion 804. The UL long burst portion 804 may sometimes be referred to as the payload of the UL-centric slot. The UL portion may refer to the communication resources utilized to communicate UL data from the subordinate entity (e.g., UE) to the scheduling entity (e.g., UE or BS). In some configurations, the control portion 802 may be a physical DL control channel (PDCCH).

As illustrated in FIG. 8, the end of the control portion 802 may be separated in time from the beginning of the UL long burst portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an UL short burst portion 806. The UL short burst portion 806 in FIG. 8 may be similar to the UL short burst portion 706 described above with reference to FIG. 7, and may include any of the information described above in connection with FIG. 7. The foregoing is merely one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some aspects, the sidelink signals may be communicated using a licensed spectrum (unlike wireless local area networks, which typically use an unlicensed spectrum).

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

As indicated above, FIG. 8 is provided merely as an example. Other examples are possible and may differ from what was described with regard to FIG. 8.

Figure 9A:
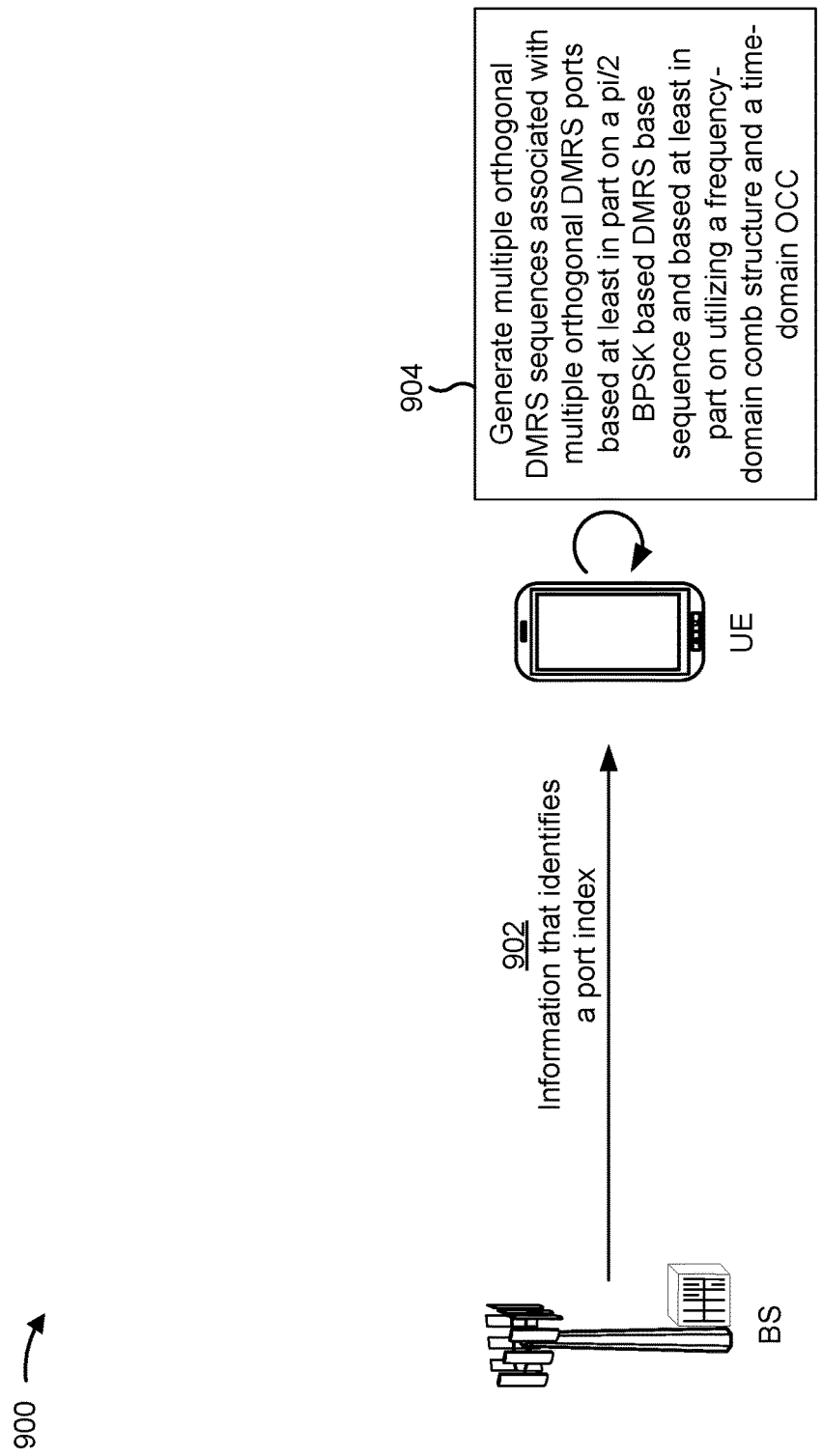

FIGS. 9A-9G are diagrams illustrating an example 900 of orthogonal demodulation reference signal (DMRS) port generation for pi/2 binary phase shift keying (BPSK), in accordance with various aspects of the present disclosure. As shown in FIG. 9A, implementation 900 includes a base station (BS) (e.g., BS 110) and a user equipment (UE) (e.g., UE 120).

As shown by reference number 902, the BS may transmit, and the UE may receive, information that identifies a port index. For example, the BS may transmit the information that identifies the port index periodically, according to a schedule, when the UE attaches to the BS, when the UE connects to the BS, when the UE requests the information from the BS, and/or the like. In some aspects, the information may identify a DMRS port that the UE is to use when transmitting data, as described below. For example, the port index may identify a particular orthogonal DMRS port that the UE is to generate and/or use for a transmission.

As shown by reference number 904, the UE may generate multiple orthogonal DMRS sequences associated with multiple orthogonal DMRS ports based at least in part on a pi/2 BPSK based DMRS base sequence and based at least in part on utilizing a frequency-domain comb structure and a time-domain OCC. For example, the UE may generate the multiple orthogonal DMRS sequences and/or the multiple orthogonal DMRS ports at a particular time, after receiving the information that identifies the port index, and/or the like.

In some aspects, an orthogonal DMRS sequence may include a DMRS sequence generated from a pi/2 BPSK based DMRS base sequence. In some aspects, an orthogonal DMRS port may include a time-frequency resource (e.g., of an OFDM symbol) via which a DMRS sequence is transmitted.

In some aspects, and as described below, the UE may generate the multiple orthogonal DMRS sequences and/or the multiple orthogonal DMRS ports based at least in part on a pi/2 BPSK based DMRS base sequence, rather than another modulation scheme, such as QPSK, QAM, and/or the like. In some aspects, and as described below, the UE may generate the multiple orthogonal DMRS sequences and/or the multiple orthogonal DMRS ports based at least in part on utilizing a frequency-domain comb structure. For example, the UE may generate the multiple orthogonal DMRS sequences and/or the multiple DMRS ports by alternating the multiple orthogonal DMRS ports on even frequency tones and odd frequency tones. In some aspects, and as described below, the UE may generate the multiple orthogonal DMRS sequences and/or the multiple orthogonal DMRS ports by utilizing a time-domain OCC. For example, the UE may generate the multiple orthogonal DMRS sequences and/or the multiple orthogonal DMRS ports across a time-domain and/or multiple OFDM symbols.

In some aspects, the UE may generate the multiple orthogonal DMRS ports based at least in part on utilizing the time-domain OCC across multiple pi/2 BPSK based DMRS base sequences, multiple repetitions of the pi/2 BPSK based DMRS base sequence, multiple portions of the pi/2 BPSK based DMRS base sequence, multiple pi/2 BPSK symbols of the pi/2 BPSK based DMRS base sequence, and/or the like. FIGS. 9B-9F show various examples related to generating the multiple orthogonal DMRS sequences and/or the multiple orthogonal DMRS ports in these manners.

Figure 9B:
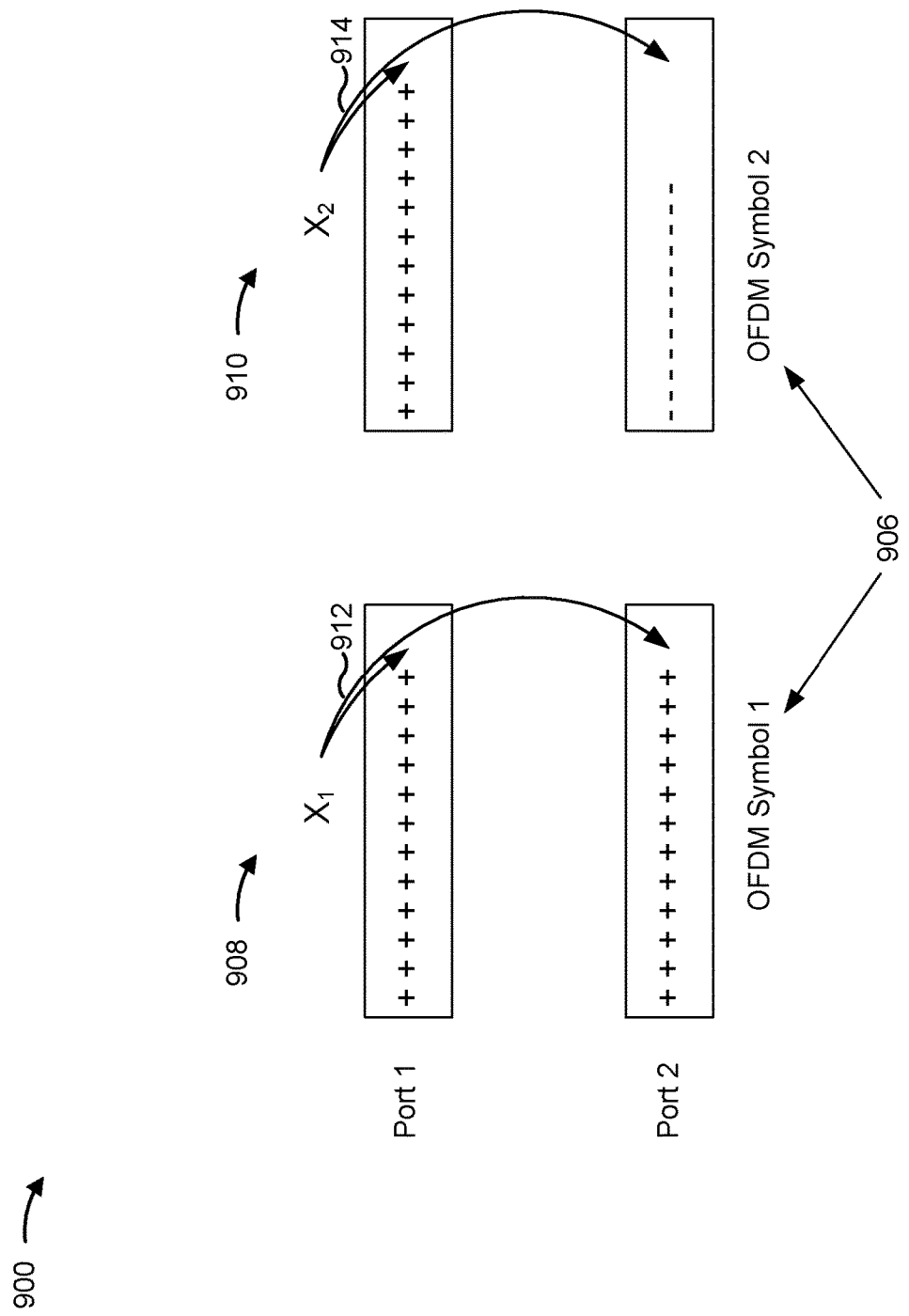

FIG. 9B shows an example of generating the multiple orthogonal DMRS sequences associated with the multiple orthogonal DMRS ports based at least in part on utilizing the time-domain OCC across multiple pi/2 BPSK based DMRS base sequences. As shown by reference number 906, the UE may generate the multiple DMRS ports across multiple OFDM symbols (e.g., OFDM symbol 1 and OFDM symbol 2). As further shown in FIG. 9B the multiple OFDM symbols may be used to transmit a respective pi/2 BPSK based DMRS sequence. For example, and as shown by reference number 908, pi/2 BPSK based DMRS sequence $X_1$ may be associated with OFDM symbol 1. As another example, and as shown by reference number 910, pi/2 BPSK based DMRS sequence $X_2$ may be associated with OFDM symbol 2. In some aspects, OFDM symbol 1 and OFDM symbol 2 may be adjacent to each other.

As shown by reference number 912, port 1 and port 2 for OFDM symbol 1 may be generated by generating pi/2 BPSK based DMRS sequence $X_1$ on OFDM symbol 1. In addition, and as further shown by reference number 912, a plus one multiplier (e.g., a positive multiplier shown as +) may be applied to both port 1 and port 2. As shown by reference number 914, port 1 and port 2 for OFDM symbol 2 may be generated by generating pi/2 BPSK based DMRS sequence $X_2$ in OFDM symbol 2. In addition, and as further shown by reference number 914, a plus one multiplier (shown as +) may be applied to port 1 and a minus one multiplier (e.g., a negative multiplier shown as −) may be applied to port 2.

In some aspects, the combination of the multipliers applied to port 1 and port 2 of OFDM symbol 1 and OFDM symbol 2 may generate orthogonality between port 1 and port 2 and across OFDM symbol 1 and OFDM symbol 2. For example, the above described configuration results in pi/2 BPSK based DMRS sequence $X_1$ and pi/2 BPSK DMRS sequence $X_2$ being transmitted via port 1 on OFDM symbols 1 and 2, respectively, and in pi/2 BPSK based DMRS sequence $X_1$ and pi/2 BPSK based DMRS sequence $-X_2$ being transmitted via port 2 on OFDM symbols 1 and 2, respectively. Using this technique (e.g., using the multipliers to multiplying +1 and −1 to a DMRS base sequence) does not change the PAPR of the sequence. In this way, the UE may generate a first DMRS port and a second DMRS port, which are orthogonal to each other, to be used to transmit two pi/2 BPSK based DMRS sequences via two adjacent OFDM symbols. In some aspects, the two pi/2 BPSK based DMRS sequences (e.g., $X_1$ and $X_2$) are the same. In some aspects, the two pi/2 BPSK based DMRS sequences (e.g., $X_1$ and $X_2$) are different.

Figure 9C:
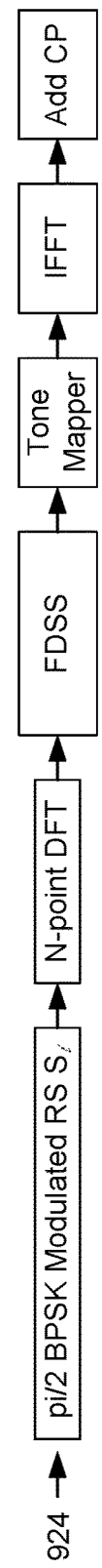

FIG. 9C shows an example of generating the multiple orthogonal DMRS sequences associated with the multiple orthogonal DMRS ports based at least in part on utilizing the time-domain OCC across multiple repetitions of the pi/2 BPSK based DMRS base sequence and/or multiple portions of the pi/2 BPSK based DMRS base sequence. For example, FIG. 9C shows the UE generating four orthogonal DMRS ports in one OFDM symbol having a length N. Reference number 916 shows a pi/2 BPSK based DMRS base sequence X. For example, the UE may generate the orthogonal DMRS ports based at least in part on pi/2 BPSK based DMRS base sequence X. As further shown by reference number 916, pi/2 BPSK based DMRS base sequence X may have a length of N divided by 2 (N/2). For example, the length of pi/2 BPSK based DMRS sequence X, which is shown within the first set of brackets shown with respect to reference number 916 is from $x_1$ (different from $X_1$ described with regard to FIG. 9B) to $x_{N/2}$. In some aspects, elements of pi/2 BPSK based DMRS sequence X (e.g., $x_1$ to $x_{N/2}$) may be pi/2 BPSK modulated symbols. As shown by reference numbers 918 and 920, pi/2 BPSK based DMRS base sequence X may include two sub-sequences, shown as sub-sequence $X_A$ and sub-sequence $X_B$. In some aspects, sub-sequence $X_A$ may represent a first half-length of the length of pi/2 BPSK based DMRS sequence X (e.g., a length from $x_1$ to $x_{N/4}$) and sub-sequence $X_B$ may represent a second half-length of the length of pi/2 BPSK based DMRS base sequence X (e.g., a length from $X_{N/4+1}$ to $x_{N/2}$). In other words, sub-sequence $X_A$ and sub-sequence $X_B$ may both have a length of N divided by 4 (N/4).

As shown by reference number 922, the UE may generate, based at least in part on sub-sequence $X_A$ and sub-sequence $X_B$, four orthogonal DMRS sequences (e.g., shown as $S_0$ through $S_3$) for which corresponding DMRS ports (e.g., shown as DMRS ports 0 through 3) are generated. In some aspects, the UE may achieve the frequency-domain comb structure via repetitions of sub-sequence $X_A$ and sub-sequence $X_B$ in a time domain to form two repetitions of the pi/2 BPSK based DMRS base sequence X. For example, to generate the orthogonal DMRS ports, the UE may repeat sub-sequence $X_A$ and sub-sequence $X_B$ twice in a time-domain to generate sequences [X, X] (e.g., DMRS sequence $S_0$), and [X, −X] (e.g., DMRS sequence $S_3$). In some aspects, the UE may utilize the frequency-domain comb structure prior to utilizing the time-domain OCC.

In some aspects, the UE may utilize the time-domain OCC on the repetitions of sub-sequence $X_A$ and sub-sequence $X_B$ to generate the four orthogonal DMRS ports. For example, the UE may utilize the time-domain OCC (e.g., [+1, +1] multipliers and [+1, −1] multipliers) within the repetitions to generate the four DMRS sequences associated with the four orthogonal DMRS ports. As a specific example, the UE may apply the time-domain OCC to DMRS sequence $S_0$ to generate DMRS sequence $S_1$ and may apply the time-domain OCC to generated orthogonal sequence $S_3$ to generate DMRS sequence $S_4$. In this way, the four generated DMRS sequences may be orthogonal to each other. Furthermore, each of the four DMRS sequences may be a pi/2 BPSK based DMRS sequence.

In some aspects, to generate the four orthogonal DMRS sequences shown by reference number 922, the UE may first repeat the DMRS base sequence two times to obtain [$X_A$, $X_B$, $X_A$, $X_B$]. This results in four portions of sub-sequences. The UE may then apply different OCCs for different DMRS ports. The same four portions (e.g., [$X_A$, $X_B$, $X_A$, $X_B$]) may be used for each of the four DMRS port with a different OCC applied. For example, the UE may apply a first OCC [+1, +1, +1, +1] to the four portions [$X_A$, $X_B$, $X_A$, $X_B$] to generate a first DMRS sequence [+$X_A$,+$X_B$,+$X_A$,+$X_B$] for the first DMRS port (shown as DMRS port 0). The UE may apply a second OCC [+1, −1, +1, −1] to the four portions [$X_A$, $X_B$, $X_A$, $X_B$] to generate a second DMRS sequence [+$X_A$, −$X_B$, +$X_A$,−$X_B$] for the second DMRS port (shown as DMRS port 1). The UE may apply a third OCC [+1, +1, −1, −1] to the four portions [$X_A$, $X_B$, $X_A$, $X_B$] to generate a third DMRS sequence [+$X_A$, +$X_B$, −$X_A$, −$X_B$] for the third DMRS port (shown as DMRS port 2). The UE may apply a fourth OCC [+1, −1, −1, +1] to the four portions [$X_A$, $X_B$, $X_A$, $X_B$] to generate a fourth DMRS sequence [+$X_A$, −$X_B$, −$X_A$, +$X_B$] for the fourth DMRS port (shown as DMRS port 3).

In some aspects, DMRS sequences $S_0$ through $S_3$ may be associated with different DMRS port groups. For example, DMRS sequence $S_0$ and DMRS sequence $S_1$ may be associated with DMRS port group 0 and DMRS sequence $S_2$ and DMRS sequence $S_3$ may be associated with DMRS port group 1.

In some aspects, different DMRS port groups may be associated with different sets of frequency tones/subcarriers. For example, DMRS port group 0 may be associated with a first set of frequency tones, and DMRS port group 1 may be associated with a second set of frequency tones that are non-overlapping with the first set of frequency tones. For example, DMRS port group 0 may be associated with odd frequency tones of a set of frequency tones from 1 to N, and DMRS port group 1 may be associated with even frequency tones of the set of frequency tones from 1 to N. In some aspects, the different port groups may be associated with a single OFDM symbol. In this way, the UE may generate four orthogonal DMRS ports in one OFDM symbol.

Reference number 924 shows various processing techniques that the UE may utilize to generate the four orthogonal DMRS signals and/or actual signals to be transmitted by the UE. For example, the UE may process pi/2 BPSK based DMRS base sequence X and/or DMRS sequences $S_0$ through $S_3$ to generate the OFDM symbol for the four orthogonal DMRS ports. In some aspects, the UE may utilize one or more components described elsewhere herein (e.g., controller/processor 280, and/or the like) to implement the processing techniques described below.

In some aspects, the UE may process pi/2 BPSK based DMRS base sequence X to generate a pi/2 BPSK modulated reference signal (RS) $S_i$ (e.g., $S_0$ through $S_3$) (e.g., shown as pi/2 BPSK modulated RS $S_i$). In some aspects, $S_i$ is then discrete Fourier transformed (DFT) to N points in the frequency domain (shown by N-point DFT). In some aspects, the output of the N-point DFT is then filtered using Frequency-Domain Spectral Shaping (FDSS). In some aspects, the output of the FDSS is then mapped to a set of subcarriers/tones in the frequency domain (shown as Tone Mapper). In some aspects, the output of the tone mapper may then be inverse discrete Fourier transformed (IFFT) back to the time domain. In some aspects, a cyclic prefix (CP) is applied to output from the IFFT. The processing flow shown in 924 may be applied to the pi/2 BPSK modulated data part of an uplink transmission, with the pi/2 BPSK modulated RS $S_l$ replaced by pi/2 BPSK modulated data.

Figure 9D:
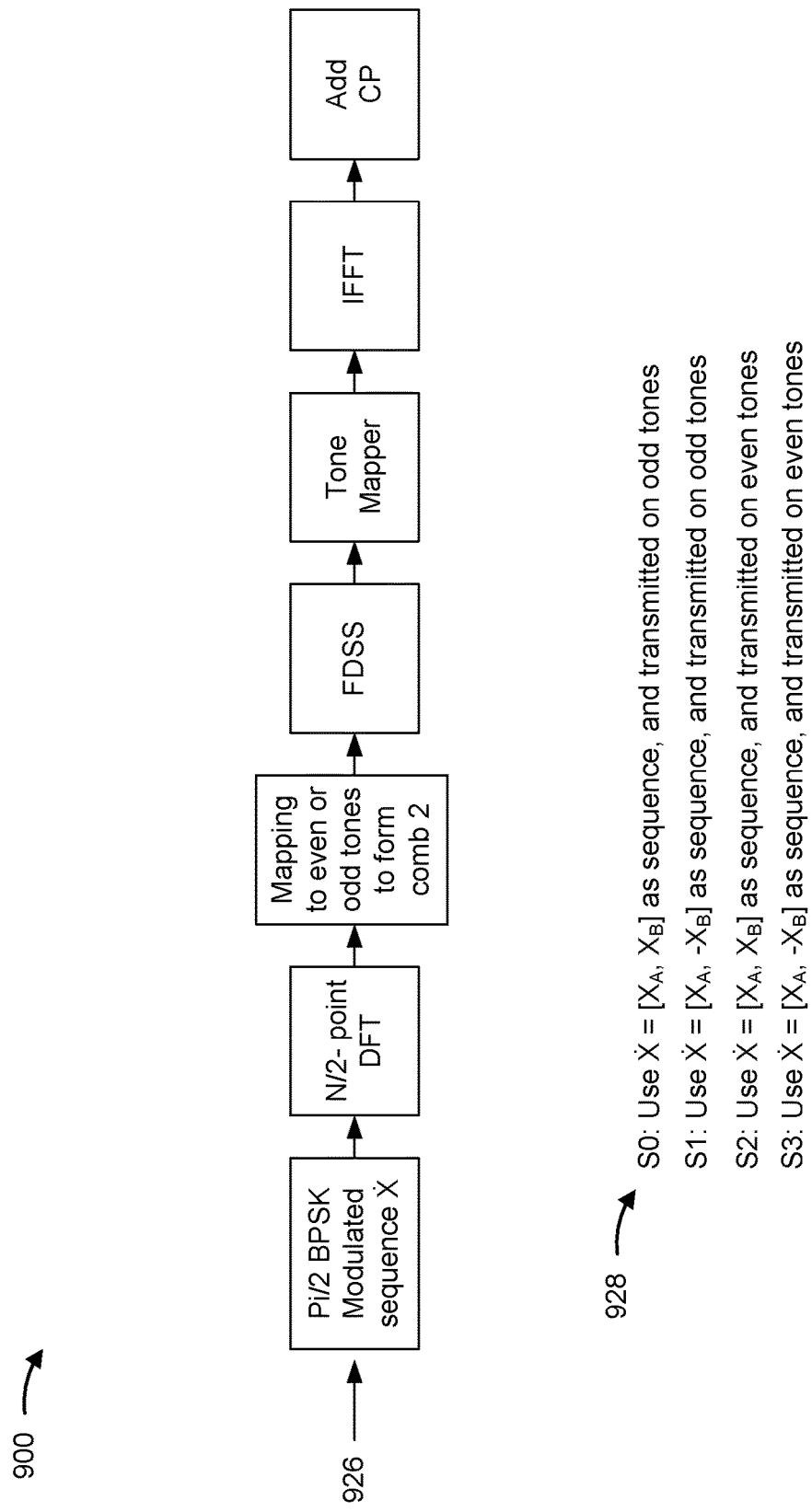

FIG. 9D shows an additional, or alternative, aspects to that described with regard to FIG. 9C. For example, aspects described with regard to FIG. 9C were described with regard to generating orthogonal DMRS ports from the perspective of the time-domain, and FIG. 9D describes aspects for generating orthogonal DMRS ports from the perspective of the frequency domain.

As shown by reference number 926, the UE may process pi/2 BPSK based DMRS base sequence X in a manner similar to that described with regard to FIG. 9C. For example, pi/2 BPSK based DMRS base sequence X may have a length of N/2, similar to that described above. In some aspects, rather than using repetitions of pi/2 BPSK based DMRS base sequence X (e.g., of sub-sequence $X_A$ and sub-sequence $X_B$) in a time domain, the UE may apply an N/2-point DFT rather than an N-point DFT (e.g., based at least in part on pi/2 BPSK based DMRS base sequence X having the length of N/2 and based at least in part on pi/2 BPSK based DMRS base sequence X not being repeated in the time-domain).

Additionally, or alternatively, the UE may generate a frequency-domain comb 2 structure after processing pi/2 BPSK based DMRS base sequence X using the N/2-point DFT. For example, the UE may generate the frequency-domain comb 2 structure in a manner similar to other frequency-domain comb structures described elsewhere herein. In some aspects, the UE may continue to process pi/2 BPSK based DMRS base sequence $\dot{X}$ in a manner similar to that described elsewhere herein. In some aspects, processing pi/2 BPSK based DMRS base sequence $\dot{X}$ and/or orthogonal DMRS sequences in this manner may result in time-domain OCC across sub-OFDM symbols and may result in generation of orthogonal DMRS ports.

As shown by reference number 928, resulting generated DMRS sequences $S_0$ and $S_l$ may be transmitted on odd frequency tones, and generated DMRS sequences $S_2$ and $S_3$ may be transmitted on even frequency tones. In this way, the four generated DMRS signals may be orthogonal to each other. Furthermore, each of the four DMRS sequences S0 to S3 may be a pi/2 BPSK based DMRS sequence (of length N/2).

Thus, in some aspects, the UE may generate multiple orthogonal DMRS sequences associated with multiple orthogonal DMRS ports by generating four orthogonal DMRS ports from the pi/2 BPSK based DMRS base sequence having a length N divided by two (N/2). The UE may generate the four orthogonal DMRS ports by utilizing a time-domain OCC on two respective portions of the pi/2 BPSK based DMRS base sequence, performing a transform precoding of length N divided by two (N/2) to generate a signal, and mapping the signal to a corresponding frequency comb. The time-domain OCC may be one of [+1, +1] and [+1, −1]. For example, the UE may apply a length-2 OCC on two respective portions of the length-N/2 base sequence, and may then apply an N/2 point DFT (e.g., transform precoding), and may then map the generated sequence on to corresponding comb (e.g., even comb versus odd comb).

Figure 9E:
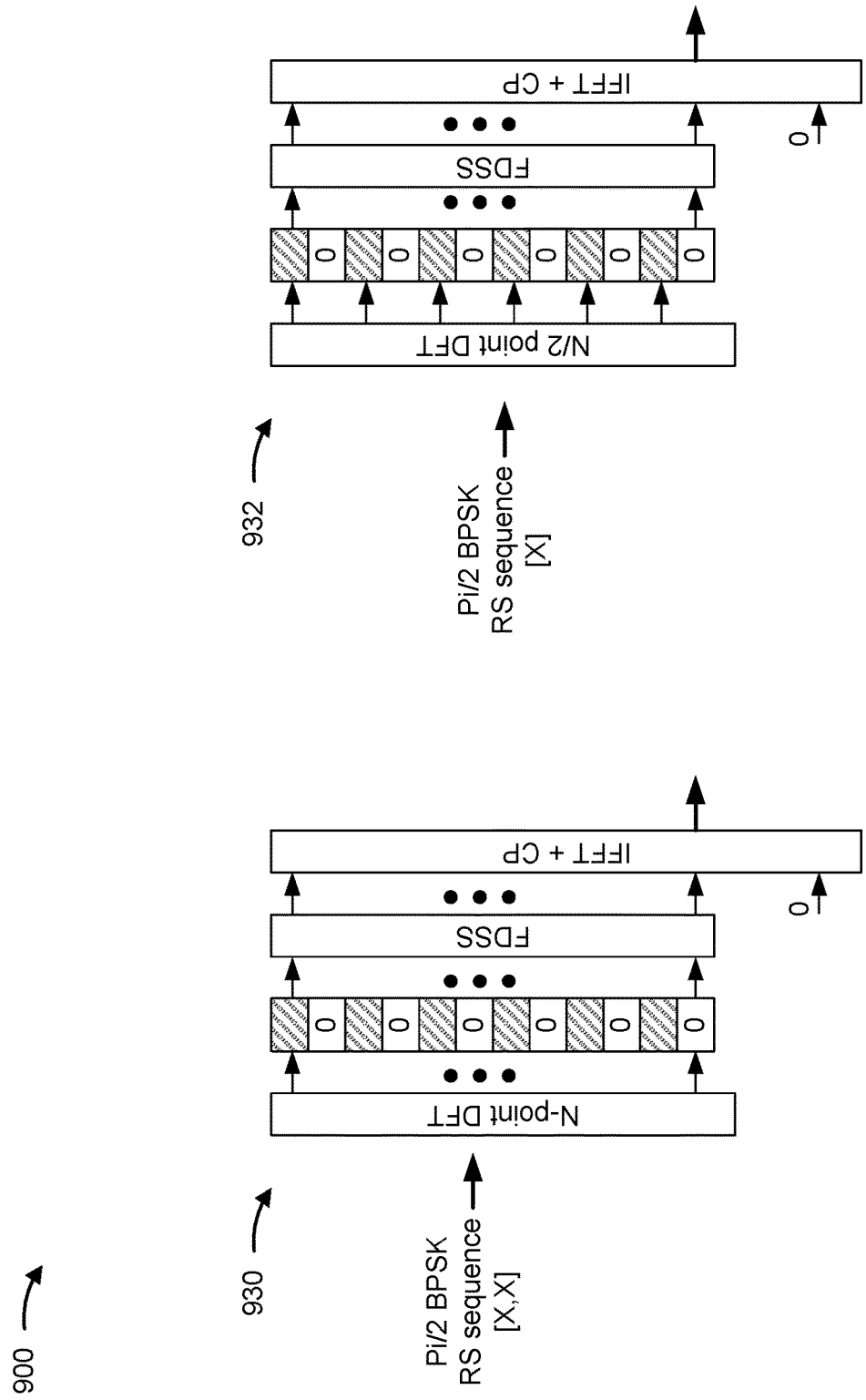

FIG. 9E shows a comparison of aspects described with regard to FIG. 9C and FIG. 9D. Reference number 930 shows the processing described with regard to FIG. 9C, where repetitions of pi/2 BPSK based DMRS base sequence X are processed to generate the multiple orthogonal DMRS ports. In some aspects, pi/2 BPSK based DMRS base sequence X may be processed to result in signal that is non-zero only in even frequency tones or is non-zero only in odd frequency tones based on the processing. Reference number 932 shows the processing described with regard to FIG. 9D, where pi/2 BPSK based DMRS base sequence X was processed to generate the multiple orthogonal DMRS ports. In some aspects, pi/2 BPSK based DMRS base sequence X may be mapped to even frequency tones or odd frequency tones based on the processing. In some aspects, the processing in reference 930 and reference number 932 may result in the same DMRS signal.

FIG. 9F shows an example of generating the multiple orthogonal DMRS sequences associated with the multiple orthogonal DMRS ports based at least in part on utilizing the time-domain OCC across multiple pi/2 BPSK symbols of the pi/2 BPSK based DMRS base sequence. As shown by reference number 934, and similar to that described elsewhere herein, a pi/2 BPSK based DMRS base sequence X of length N/2 may be used to generate four orthogonal DMRS sequences of respective length N. In some aspects, the UE may repeat the pi/2 BPSK based DMRS base sequence X two times and concatenate the two repetitions to obtain a pi/2 BPSK based DMRS sequence of length N. In some aspects, the UE may repeat the resulting length N pi/2 based DMRS sequence four times to form four copies of the length N pi/2 BPSK based DMRS sequence, and may alternate multipliers for two of the four repetitions from two other repetitions of the four repetitions to generate the four orthogonal DMRS sequences associated with the four DMRS ports. For example, and as shown by reference number 936, the UE may generate DMRS sequences $S_0$ and $S_2$, which are orthogonal to each other, and may generate DMRS sequence $S_1$ from DMRS sequence $S_0$ and DMRS sequence $S_3$ from DMRS sequence Sz by alternating the multipliers of DMRS sequence $S_0$ for DMRS sequence $S_1$ and the multipliers of DMRS sequence $S_2$ for DMRS sequence $S_3$.

In some aspects, DMRS sequences $S_0$ and $S_2$ may be generated by repeating pi/2 BPSK based DMRS base sequence X two times and applying time-domain OCC with [+1, +1] and [+1, −1] multipliers to respective repetitions of pi/2 BPSK based DMRS base sequence X to obtain DMRS sequences $S_0$ and $S_2$, in a manner that is the same as or similar to that described with regard to FIG. 9C.

Figure 9G:
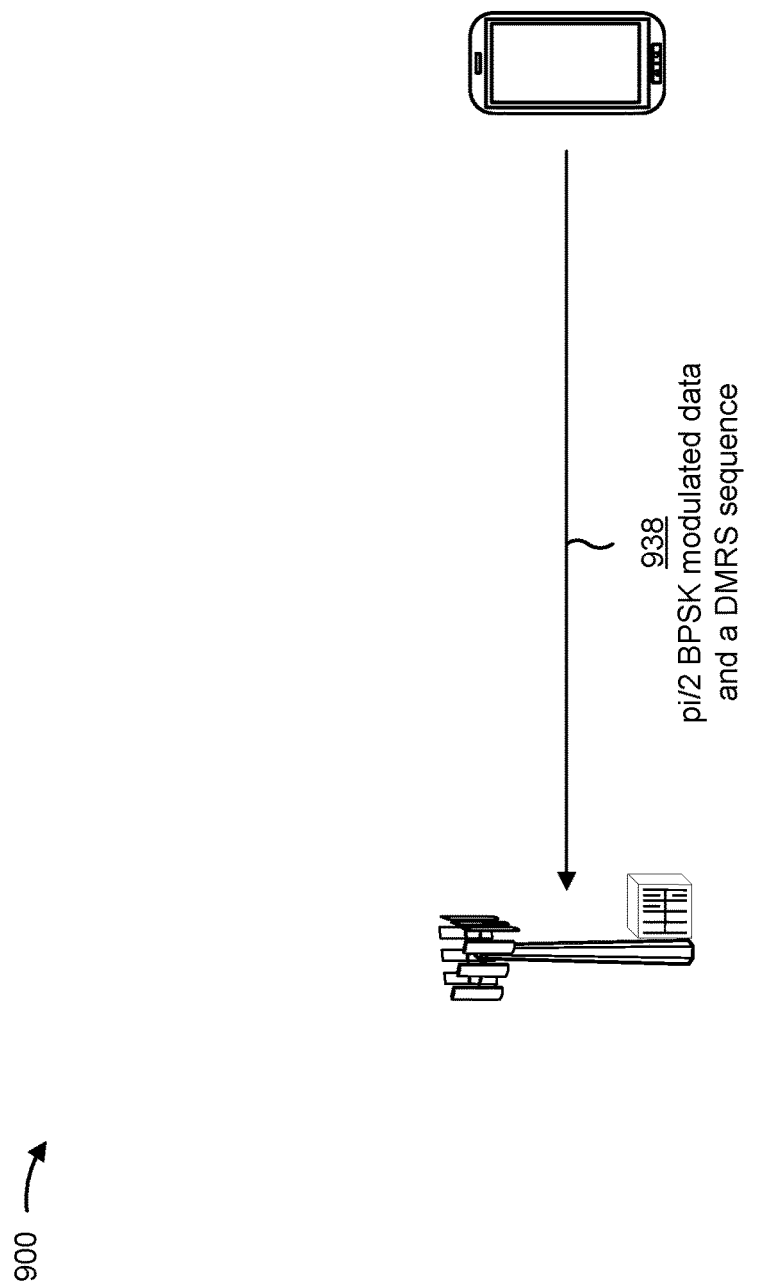

Turning to FIG. 9G, and as shown by reference number 938, the UE may transmit, and the BS may receive, the pi/2 BPSK modulated data and a DMRS sequence associated with a DMRS port. In some aspects, the UE may only transmit via a subset of DMRS ports generated. For example, the UE may transmit via a DMRS port identified by the port index received from the BS. In some aspects, one or more other UEs may use any unused DMRS ports that the UE does not use. In some aspects, the UE may transmit the pi/2 BPSK modulated data and the DMRS sequence in association with a physical uplink control channel (PUCCH), a physical uplink shared channel (PUSCH), and/or the like. In some aspects, the UE may transmit the pi/2 BPSK modulated data and the DMRS sequence associated with the DMRS port on a multi-user, multiple input multiple output (MU-MIMO) uplink channel (e.g., a new radio (NR) uplink channel).

In some aspects, the UE may determine a DMRS port, of the multiple orthogonal DMRS ports, to be used in association with a transmission of the pi/2 BPSK modulated data prior to transmitting the pi/2 BPSK modulated data and the DMRS sequence. For example, the UE may determine the DMRS port based at least in part on receiving information that identifies a port index of the DMRS port to be used (e.g., received from the BS).

As indicated above, FIGS. 9A-9G are provided as an example. Other examples are possible and may differ from what was described with respect to FIGS. 9A-9G.

FIG. 10 is a diagram illustrating an example process 1000 performed, for example, by a UE, in accordance with various aspects of the present disclosure. Example process 1000 is an example where the UE (e.g., UE 120 and/or the like) performs operations associated with orthogonal DMRS port generation for pi/2 BPSK.

As shown in FIG. 10, in some aspects, process 1000 may include generating multiple orthogonal demodulation reference signal (DMRS) sequences associated with multiple orthogonal DMRS ports based at least in part on a pi/2 binary phase shift keying (BPSK) based DMRS base sequence and based at least in part on utilizing at least one of a frequency-domain comb structure or a time-domain orthogonal cover code (OCC), wherein the multiple orthogonal DMRS ports are associated with different UEs (block 1010). For example, the UE (e.g., using transmit processor 264, controller/processor 280, memory 282, and/or the like) may generate multiple orthogonal DMRS sequences associated with multiple orthogonal DMRS ports based at least in part on a pi/2 BPSK based DMRS base sequence and based at least in part on utilizing at least one of a frequency-domain comb structure or a time-domain orthogonal cover code (OCC), as described above. In some aspects, the multiple orthogonal DMRS ports are associated with different UEs.

As further shown in FIG. 10, in some aspects, process 1000 may include determining a DMRS port, of the multiple orthogonal DMRS ports, to be used in association with a transmission of pi/2 BPSK modulated data (block 1020). For example, the UE (e.g., using transmit processor 264, controller/processor 280, memory 282, and/or the like) may determine a DMRS port, of the multiple orthogonal DMRS ports, to be used in association with a transmission of pi/2 BPSK modulated data, as described above.

As further shown in FIG. 10, in some aspects, process 1000 may include transmitting the pi/2 BPSK modulated data and a DMRS sequence, of the multiple orthogonal DMRS sequences, associated with the DMRS port (block 1030). For example, the UE (e.g., using transmit processor 264, controller/processor 280, memory 282, and/or the like) may transmit the pi/2 BPSK modulated data and a DMRS sequence, of the multiple orthogonal DMRS sequences, associated with the DMRS port, as described above.

Process 1000 may include additional aspects, such as any single aspect or any combination of aspects described below and/or in connection with one or more other processes described elsewhere herein.

In a first aspect, transmitting the pi/2 BPSK modulated data and the DMRS sequence comprises: transmitting the pi/2 BPSK modulated data and the DMRS sequence in association with at least one of: a physical uplink control channel (PUCCH), or a physical uplink shared channel (PUSCH).

In a second aspect, alone or in combination with the first aspect, generating the multiple orthogonal DMRS sequences associated with the multiple orthogonal DMRS ports comprises: generating the multiple orthogonal DMRS sequences associated with the multiple orthogonal DMRS ports based at least in part on utilizing the time-domain OCC across at least one of: multiple pi/2 BPSK based DMRS base sequences, multiple repetitions of the pi/2 BPSK based DMRS base sequence, multiple portions of the pi/2 BPSK based DMRS base sequence, or multiple pi/2 BPSK symbols of the pi/2 BPSK based DMRS base sequence.

In a third aspect, alone or in combination with one or more of the first and second aspects, the multiple orthogonal DMRS sequences are pi/2 BPSK based DMRS sequences.

In a fourth aspect, alone or in combination with one or more of the first through third aspects, transmitting the pi/2 BPSK modulated data and the DMRS sequence comprises: transmitting the pi/2 BPSK modulated data and the DMRS sequence associated with the DMRS port on a multi-user, multiple input multiple output (MU-MIMO) uplink channel, wherein unused DMRS ports, of the multiple orthogonal DMRS ports, are associated with one or more other UEs.

In a fifth aspect, alone or in combination with one or more of the first through fourth aspects, generating the multiple orthogonal DMRS sequences associated with the multiple orthogonal DMRS ports comprises: generating the multiple orthogonal DMRS sequences associated with the multiple orthogonal DMRS ports across two OFDM symbols based at least in part on two DMRS base sequences, wherein, for a first DMRS port of the multiple orthogonal DMRS ports, a first DMRS base sequence of the two DMRS base sequences is used on a first OFDM symbol of the two OFDM symbols, and a second DMRS base sequence of the two DMRS base sequences is used on a second OFDM symbol of the two OFDM symbols, wherein, for a second DMRS port of the multiple orthogonal DMRS ports, the first DMRS base sequence is used on the first OFDM symbol, and a negatively multiplied version of the second DMRS base sequence is used on the second OFDM symbol, wherein the first OFDM symbol and the second OFDM symbol are adjacent OFDM symbols.

In a sixth aspect, alone or in combination with one or more of the first through fifth aspects, generating the multiple orthogonal DMRS sequences associated with the multiple orthogonal DMRS ports comprises: generating four orthogonal DMRS sequences having a respective length N from the pi/2 BPSK based DMRS base sequence having a length N divided by two (N/2) based at least in part on: repeating the pi/2 BPSK based DMRS base sequence two times to form two repetitions of the pi/2 BPSK based DMRS base sequence, dividing each of the two repetitions of the pi/2 BPSK based DMRS base sequence into two respective portions of equal length to form four total portions of the pi/2 BPSK based DMRS base sequence, and generating each of the four orthogonal DMRS sequences by multiplying the four total portions of the pi/2 BPSK based DMRS base sequence by a respective length-four time-domain OCC that is different for different orthogonal DMRS sequences, wherein the four total portions have a respective length of N divided by 4 (N/4).

In a seventh aspect, alone or in combination with one or more of the first through sixth aspects, generating each of the four orthogonal DMRS sequences by multiplying the four total portions of the pi/2 BPSK based DMRS base sequence by the respective length-four time-domain OCC that is different for different orthogonal DMRS sequences comprises: multiplying the four total portions by [+1, +1, +1, +1] to generate a first DMRS sequence of the four orthogonal DMRS sequences, multiplying the four total portions by [+1, −1, +1, −1] to generate a second DMRS sequence of the four orthogonal DMRS sequences, multiplying the four total portions by [+1, +1, −1, −1] to generate a third DMRS sequence of the four orthogonal DMRS sequences, and multiplying the four total portions by [+1, −1, −1, +1] to generate a fourth DMRS sequence of the four orthogonal DMRS sequences.

In an eighth aspect, alone or in combination with one or more of the first through seventh aspects, process 1000 includes processing the four total portions of the pi/2 BPSK based DMRS base sequence to generate one OFDM symbol based at least in part on generating the four orthogonal DMRS sequences.

In a ninth aspect, alone or in combination with one or more of the first through eighth aspects, generating the multiple orthogonal DMRS sequences associated with the multiple orthogonal DMRS ports comprises: generating four orthogonal DMRS ports from the pi/2 BPSK based DMRS base sequence having a length N divided by two (N/2) based at least in part on: utilizing the time-domain OCC on two respective portions of the pi/2 BPSK based DMRS base sequence, wherein the time-domain OCC is one of [+1, +1] and [+1, −1]; performing a transform precoding of length N divided by two (N/2) to generate a signal; and mapping the signal to a corresponding frequency comb.

In a tenth aspect, alone or in combination with one or more of the first through ninth aspects, generating the multiple orthogonal DMRS sequences associated with the multiple orthogonal DMRS ports comprises: generating four orthogonal DMRS ports from the pi/2 BPSK based DMRS base sequence having a length N divided by two (N/2) based at least in part on: repeating the pi/2 BPSK based DMRS base sequence two times to form a sequence having length N; generating four repetitions of the sequence having length N; and for each of the four repetitions, multiplying a corresponding OCC sequence to each element of a set of pi/2 BPSK symbols included in the pi/2 BPSK based DMRS base sequence, wherein the corresponding OCC sequence for a repetition is one of [+1, +1, +1, +1], [+1, −1, +1, −1], [+1, +1, −1, −1], or [+1, −1, −1, +1].

In an eleventh aspect, alone or in combination with one or more of the first through tenth aspects, determining the DMRS port comprises: determining the DMRS port based at least in part on receiving information that identifies a port index of the DMRS port to be used.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    generating multiple orthogonal demodulation reference signal (DMRS) sequences associated with multiple orthogonal DMRS ports based at least in part on a pi/2 binary phase shift keying (BPSK) based DMRS base sequence and based at least in part on utilizing at least one of a frequency-domain comb structure or a time-domain orthogonal cover code (OCC),
        wherein unused DMRS ports, of the multiple orthogonal DMRS ports, are associated with one or more other UEs, and
        wherein generating the multiple orthogonal DMRS sequences associated with the multiple orthogonal DMRS ports comprises at least one of:
            generating the multiple orthogonal DMRS sequences associated with the multiple orthogonal DMRS ports across two OFDM symbols based at least in part on two DMRS base sequences, or
            generating four orthogonal DMRS sequences having a respective length N from the pi/2 BPSK based DMRS base sequence having a length N divided by two (N/2);
    determining a DMRS port, of the multiple orthogonal DMRS ports, to be used in association with a transmission of pi/2 BPSK modulated data; and transmitting the pi/2 BPSK modulated data and a DMRS sequence, of the multiple orthogonal DMRS sequences, associated with the DMRS port.

2. The method of claim 1, wherein transmitting the pi/2 BPSK modulated data and the DMRS sequence comprises:
transmitting the pi/2 BPSK modulated data and the DMRS sequence in association with at least one of:
a physical uplink control channel (PUCCH), or
a physical uplink shared channel (PUSCH).

3. The method of claim 1, wherein generating the multiple orthogonal DMRS sequences associated with the multiple orthogonal DMRS ports comprises:
generating the multiple orthogonal DMRS sequences associated with the multiple orthogonal DMRS ports based at least in part on utilizing the time-domain OCC across at least one of:
multiple pi/2 BPSK based DMRS base sequences,
multiple repetitions of the pi/2 BPSK based DMRS base sequence,
multiple portions of the pi/2 BPSK based DMRS base sequence, or
multiple pi/2 BPSK symbols of the pi/2 BPSK based DMRS base sequence.

4. The method of claim 1, wherein the multiple orthogonal DMRS sequences are pi/2 BPSK based DMRS sequences.

5. The method of claim 1, wherein transmitting the pi/2 BPSK modulated data and the DMRS sequence comprises:
transmitting the pi/2 BPSK modulated data and the DMRS sequence associated with the DMRS port on a multi-user, multiple input multiple output (MU-MIMO) uplink channel.

6. The method of claim 1, wherein generating the multiple orthogonal DMRS sequences associated with the multiple orthogonal DMRS ports comprises:
generating the multiple orthogonal DMRS sequences associated with the multiple orthogonal DMRS ports across the two OFDM symbols based at least in part on the two DMRS base sequences,
wherein, for a first DMRS port of the multiple orthogonal DMRS ports, a first DMRS base sequence of the two DMRS base sequences is used on a first OFDM symbol of the two OFDM symbols, and a second DMRS base sequence of the two DMRS base sequences is used on a second OFDM symbol of the two OFDM symbols,
wherein, for a second DMRS port of the multiple orthogonal DMRS ports, the first DMRS base sequence is used on the first OFDM symbol, and a negatively multiplied version of the second DMRS base sequence is used on the second OFDM symbol,
wherein the first OFDM symbol and the second OFDM symbol are adjacent OFDM symbols.

7. The method of claim 1, wherein generating the multiple orthogonal DMRS sequences associated with the multiple orthogonal DMRS ports comprises:
generating the four orthogonal DMRS sequences having the respective length N from the pi/2 BPSK based DMRS base sequence having the length N divided by two (N/2) based at least in part on:
repeating the pi/2 BPSK based DMRS base sequence two times to form two repetitions of the pi/2 BPSK based DMRS base sequence,
dividing each of the two repetitions of the pi/2 BPSK based DMRS base sequence into two respective portions of equal length to form four total portions of the pi/2 BPSK based DMRS base sequence, and
generating each of the four orthogonal DMRS sequences by multiplying the four total portions of the pi/2 BPSK based DMRS base sequence by a respective length-four time-domain OCC that is different for different orthogonal DMRS sequences,
wherein the four total portions have a respective length of N divided by 4 (N/4).

8. The method of claim 7, wherein generating each of the four orthogonal DMRS sequences by multiplying the four total portions of the pi/2 BPSK based DMRS base sequence by the respective length-four time-domain OCC that is different for different orthogonal DMRS sequences comprises:
multiplying the four total portions by [+1, +1, +1, +1] to generate a first DMRS sequence of the four orthogonal DMRS sequences,
multiplying the four total portions by [+1, −1, +1, −1] to generate a second DMRS sequence of the four orthogonal DMRS sequences,
multiplying the four total portions by [+1, +1, −1, −1] to generate a third DMRS sequence of the four orthogonal DMRS sequences, and
multiplying the four total portions by [+1, −1,−1, +1] to generate a fourth DMRS sequence of the four orthogonal DMRS sequences.

9. The method of claim 7, further comprising:
processing the four total portions of the pi/2 BPSK based DMRS base sequence to generate one OFDM symbol based at least in part on generating the four orthogonal DMRS sequences.

10. The method of claim 1, wherein generating the multiple orthogonal DMRS sequences associated with the multiple orthogonal DMRS ports comprises:
generating four orthogonal DMRS ports from the pi/2 BPSK based DMRS base sequence having the length N divided by two (N/2) based at least in part on:
utilizing the time-domain OCC on two respective portions of the pi/2 BPSK based DMRS base sequence, wherein the time-domain OCC is one of [+1, +1] and [+1, −1];
performing a transform precoding of length N divided by two (N/2) to generate a signal; and
mapping the signal to a corresponding frequency comb.

11. The method of claim 1, wherein generating the multiple orthogonal DMRS sequences associated with the multiple orthogonal DMRS ports comprises:
generating four orthogonal DMRS ports from the pi/2 BPSK based DMRS base sequence having the length N divided by two (N/2) based at least in part on:
repeating the pi/2 BPSK based DMRS base sequence two times to form a sequence having length N;
generating four repetitions of the sequence having length N; and
for each of the four repetitions, multiplying a corresponding OCC sequence to each element of a set of pi/2 BPSK symbols included in the pi/2 BPSK based DMRS base sequence, wherein the corresponding OCC sequence for a repetition is one of [+1, +1, +1, +1], [+1, −1, +1, −1], [+1, +1, −1, −1], or [+1, −1, −1, +1].

12. The method of claim 1, wherein determining the DMRS port comprises:
determining the DMRS port based at least in part on receiving information that identifies a port index of the DMRS port to be used.

13. The method of claim 1, wherein generating the multiple orthogonal DMRS sequences associated with the multiple orthogonal DMRS ports comprises:
generating the multiple orthogonal DMRS sequences associated with the multiple orthogonal DMRS ports across the two OFDM symbols based at least in part on the two DMRS base sequences.

14. The method of claim 1, wherein generating the multiple orthogonal DMRS sequences associated with the multiple orthogonal DMRS ports comprises:
generating the four orthogonal DMRS sequences having the respective length N from the pi/2 BPSK based DMRS base sequence having the length N divided by two (N/2).

15. A user equipment (UE) for wireless communication, comprising:
a memory; and
one or more processors operatively coupled to the memory, the memory storing instructions executable by the one or more processors to cause the UE to:
generate multiple orthogonal demodulation reference signal (DMRS) sequences associated with multiple orthogonal DMRS ports based at least in part on a pi/2 binary phase shift keying (BPSK) based DMRS base sequence and based at least in part on utilizing at least one of a frequency-domain comb structure or a time-domain orthogonal cover code (OCC),
wherein unused DMRS ports, of the multiple orthogonal DMRS ports, are associated with one or more other UEs, and
wherein the one or more processors, when generating the multiple orthogonal DMRS sequences associated with the multiple orthogonal DMRS ports, are further configured to at least one of:
generate the multiple orthogonal DMRS sequences associated with the multiple orthogonal DMRS ports across two OFDM symbols based at least in part on two DMRS base sequences, or
generate four orthogonal DMRS sequences having a respective length N from the pi/2 BPSK based DMRS base sequence having a length N divided by two (N/2);
determine a DMRS port, of the multiple orthogonal DMRS ports, to be used in association with a transmission of pi/2 BPSK modulated data; and
transmit the pi/2 BPSK modulated data and a DMRS sequence, of the multiple orthogonal DMRS sequences, associated with the DMRS port.

16. The UE of claim 15, wherein the instructions, when transmitting the pi/2 BPSK modulated data and the DMRS sequence, are further executable by the one or processors to cause the UE to:
transmit the pi/2 BPSK modulated data and the DMRS sequence in association with at least one of:
a physical uplink control channel (PUCCH), or
a physical uplink shared channel (PUSCH).

17. The UE of claim 15, wherein the instructions, when generating the multiple orthogonal DMRS sequences associated with the multiple orthogonal DMRS ports, are further executable by the one or processors to cause the UE to:
generate the multiple orthogonal DMRS sequences associated with the multiple orthogonal DMRS ports based at least in part on utilizing the time-domain OCC across at least one of:
multiple pi/2 BPSK based DMRS base sequences,
multiple repetitions of the pi/2 BPSK based DMRS base sequence,
multiple portions of the pi/2 BPSK based DMRS base sequence, or
multiple pi/2 BPSK symbols of the pi/2 BPSK based DMRS base sequence.

18. The UE of claim 15, wherein the multiple orthogonal DMRS sequences are pi/2 BPSK based DMRS sequences.

19. The UE of claim 15, wherein the instructions, when transmitting the pi/2 BPSK modulated data and the DMRS sequence, are further executable by the one or processors to cause the UE to:
transmit the pi/2 BPSK modulated data and the DMRS sequence associated with the DMRS port on a multi-user, multiple input multiple output (MU-MIMO) uplink channel.

20. The UE of claim 15, wherein the instructions, when generating the multiple orthogonal DMRS sequences associated with the multiple orthogonal DMRS ports, are further executable by the one or processors to cause the UE to:
generate the multiple orthogonal DMRS sequences associated with the multiple orthogonal DMRS ports across the two OFDM symbols based at least in part on the two DMRS base sequences,
wherein, for a first DMRS port of the multiple orthogonal DMRS ports, a first DMRS base sequence of the two DMRS base sequences is used on a first OFDM symbol of the two OFDM symbols, and a second DMRS base sequence of the two DMRS base sequences is used on a second OFDM symbol of the two OFDM symbols,
wherein, for a second DMRS port of the multiple orthogonal DMRS ports, the first DMRS base sequence is used on the first OFDM symbol, and a negatively multiplied version of the second DMRS base sequence is used on the second OFDM symbol,
wherein the first OFDM symbol and the second OFDM symbol are adjacent OFDM symbols.

21. The UE of claim 15, wherein the instructions, when generating the multiple orthogonal DMRS sequences associated with the multiple orthogonal DMRS ports, are further executable by the one or processors to cause the UE to:
generate the four orthogonal DMRS sequences having the respective length N from the pi/2 BPSK based DMRS base sequence having the length N divided by two (N/2) based at least in part on:
repeating the pi/2 BPSK based DMRS base sequence two times to form two repetitions of the pi/2 BPSK based DMRS base sequence,
dividing each of the two repetitions of the pi/2 BPSK based DMRS base sequence into two respective portions of equal length to form four total portions of the pi/2 BPSK based DMRS base sequence, and
generate each of the four orthogonal DMRS sequences by multiplying the four total portions of the pi/2 BPSK based DMRS base sequence by a respective length-four time-domain OCC that is different for different orthogonal DMRS sequences,
wherein the four total portions have a respective length of N divided by 4 (N/4).

22. The UE of claim 21, wherein the instructions, when generating each of the four orthogonal DMRS sequences by multiplying the four total portions of the pi/2 BPSK based DMRS base sequence by the respective length-four time-domain OCC that is different for different orthogonal DMRS sequences, are executable by the one or processors to cause the UE to:

multiply the four total portions by [+1, +1, +1, +1] to generate a first DMRS sequence of the four orthogonal DMRS sequences, multiply the four total portions by [+1, −1, +1, −1] to generate a second DMRS sequence of the four orthogonal DMRS sequences, multiply the four total portions by [+1, +1, −1, −1] to generate a third DMRS sequence of the four orthogonal DMRS sequences, and multiply the four total portions by [+1, −1, −1, +1] to generate a fourth DMRS sequence of the four orthogonal DMRS sequences.

23. The UE of claim 21, wherein instructions are further executable by the one or processors to cause the UE to:

process the four total portions of the pi/2 BPSK based DMRS base sequence to generate one OFDM symbol based at least in part on generating the four orthogonal DMRS sequences.

24. The UE of claim 15, wherein the instructions, when generating the multiple orthogonal DMRS sequences associated with the multiple orthogonal DMRS ports, are further executable by the one or processors to cause the UE to:

generate four orthogonal DMRS ports from the pi/2 BPSK based DMRS base sequence having the length N divided by two (N/2) based at least in part on:
utilizing the time-domain OCC on two respective portions of the pi/2 BPSK based DMRS base sequence, wherein the time-domain OCC is one of [+1, +1] and [+1, −1];
performing a transform precoding of length N divided by two (N/2) to generate a signal; and
mapping the signal to a corresponding frequency comb.

25. The UE of claim 15, wherein the instructions, when generating the multiple orthogonal DMRS sequences associated with the multiple orthogonal DMRS ports, are further executable by the one or processors to cause the UE to:

generate four orthogonal DMRS ports from the pi/2 BPSK based DMRS base sequence having the length N divided by two (N/2) based at least in part on:
repeating the pi/2 BPSK based DMRS base sequence two times to form a sequence having length N;
generating four repetitions of the sequence having length N; and
for each of the four repetitions, multiplying a corresponding OCC sequence to each element of a set of pi/2 BPSK symbols included in the pi/2 BPSK based DMRS base sequence, wherein the corresponding OCC sequence for a repetition is one of [+1, +1, +1, +1], [+1, −1, +1, −1], [+1, +1, −1, −1], or [+1, −1, −1, +1].

26. The UE of claim 15, wherein the instructions, when determining the DMRS port, are further executable by the one or processors to cause the UE to:

determine the DMRS port based at least in part on receiving information that identifies a port index of the DMRS port to be used.

27. A non-transitory computer-readable medium storing one or more instructions for wireless communication, the one or more instructions comprising:

one or more instructions that, when executed by one or more processors of a user equipment (UE), cause the UE to:
generate multiple orthogonal demodulation reference signal (DMRS) sequences associated with multiple orthogonal DMRS ports based at least in part on a pi/2 binary phase shift keying (BPSK) based DMRS base sequence and based at least in part on utilizing at least one of a frequency-domain comb structure or a time-domain orthogonal cover code (OCC), wherein unused DMRS ports, of the multiple orthogonal DMRS ports, are associated with one or more other UEs, and wherein the one or more instructions, that cause the one or more processors to generate the multiple orthogonal DMRS sequences associated with the multiple orthogonal DMRS ports, further cause the UE to at least one of:
generate the multiple orthogonal DMRS sequences associated with the multiple orthogonal DMRS ports across two OFDM symbols based at least in part on two DMRS base sequences, or
generate four orthogonal DMRS sequences having a respective length N from the pi/2 BPSK based DMRS base sequence having a length N divided by two (N/2);

determine a DMRS port, of the multiple orthogonal DMRS ports, to be used in association with a transmission of pi/2 BPSK modulated data; and transmit the pi/2 BPSK modulated data and a DMRS sequence, of the multiple orthogonal DMRS sequences, associated with the DMRS port.

28. The non-transitory computer-readable medium of claim 27, wherein the one or more instructions, that cause the one or more processors to generate the multiple orthogonal DMRS sequences associated with the multiple orthogonal DMRS ports, further cause the UE to:

generate the multiple orthogonal DMRS sequences associated with the multiple orthogonal DMRS ports based at least in part on utilizing the time-domain OCC across at least one of:
multiple pi/2 BPSK based DMRS base sequences,
multiple repetitions of the pi/2 BPSK based DMRS base sequence,
multiple portions of the pi/2 BPSK based DMRS base sequence, or
multiple pi/2 BPSK symbols of the pi/2 BPSK based DMRS base sequence.

29. The non-transitory computer-readable medium of claim 27, wherein the one or more instructions, that cause the one or more processors to generate the multiple orthogonal DMRS sequences associated with the multiple orthogonal DMRS ports, further cause the UE to:

generate the multiple orthogonal DMRS sequences associated with the multiple orthogonal DMRS ports across the two OFDM symbols based at least in part on the two DMRS base sequences,
wherein, for a first DMRS port of the multiple orthogonal DMRS ports, a first DMRS base sequence of the two DMRS base sequences is used on a first OFDM symbol of the two OFDM symbols, and a second DMRS base sequence of the two DMRS base sequences is used on a second OFDM symbol of the two OFDM symbols,
wherein, for a second DMRS port of the multiple orthogonal DMRS ports, the first DMRS base sequence is used on the first OFDM symbol, and a negatively multiplied version of the second DMRS base sequence is used on the second OFDM symbol,
wherein the first OFDM symbol and the second OFDM symbol are adjacent OFDM symbols.

30. An apparatus for wireless communication, comprising:

means for generating multiple orthogonal demodulation reference signal (DMRS) sequences associated with multiple orthogonal DMRS ports based at least in part on a pi/2 binary phase shift keying (BPSK) based DMRS base sequence and based at least in part on utilizing at least one of a frequency-domain comb structure or a time-domain orthogonal cover code (OCC),
  wherein unused DMRS ports, of the multiple orthogonal DMRS ports, are associated with one or more other UEs, and
  wherein the means for generating the multiple orthogonal DMRS sequences associated with the multiple orthogonal DMRS ports further comprises at least one of:
    means for generating the multiple orthogonal DMRS sequences associated with the multiple orthogonal DMRS ports across two OFDM symbols based at least in part on two DMRS base sequences, or
    means for generating four orthogonal DMRS sequences having a respective length N from the pi/2 BPSK based DMRS base sequence having a length N divided by two (N/2);
  means for determining a DMRS port, of the multiple orthogonal DMRS ports, to be used in association with a transmission of pi/2 BPSK modulated data; and
  means for transmitting the pi/2 BPSK modulated data and a DMRS sequence, of the multiple orthogonal DMRS sequences, associated with the DMRS port.

31. The apparatus of claim 30, wherein the means for generating the multiple orthogonal DMRS sequences associated with the multiple orthogonal DMRS ports further comprises:

means for generating the multiple orthogonal DMRS sequences associated with the multiple orthogonal DMRS ports based at least in part on utilizing the time-domain OCC across at least one of:
  multiple pi/2 BPSK based DMRS base sequences,
  multiple repetitions of the pi/2 BPSK based DMRS base sequence,
  multiple portions of the pi/2 BPSK based DMRS base sequence, or
  multiple pi/2 BPSK symbols of the pi/2 BPSK based DMRS base sequence.

32. The apparatus of claim 30, wherein the means for generating the multiple orthogonal DMRS sequences associated with the multiple orthogonal DMRS ports further comprises:

means for generating four orthogonal DMRS ports from the pi/2 BPSK based DMRS base sequence having the length N divided by two (N/2) based at least in part on:
  repeating the pi/2 BPSK based DMRS base sequence two times to form a sequence having length N;
  generating four repetitions of the sequence having length N; and
  for each of the four repetitions, multiplying a corresponding OCC sequence to each element of a set of pi/2 BPSK symbols included in the pi/2 BPSK based DMRS base sequence, wherein the corresponding OCC sequence for a repetition is one of [+1, +1, +1, +1], [+1, −1, +1, −1], [+1, +1, −1, −1], or [+1, −1, −1, +1].

* * * * *